(12) United States Patent
Steinmetz et al.

(10) Patent No.: US 6,219,626 B1
(45) Date of Patent: Apr. 17, 2001

(54) AUTOMATED DIAGNOSTIC SYSTEM

(76) Inventors: Michael J. Steinmetz, 856 Aspenwood Cir., Kissimmee, FL (US) 34743; Michael E. Kirst, 2637 Mill Run Blvd., Kissimmee, FL (US) 34744

( * ) Notice: Subject to any disclaimer, the term of this patent is extended or adjusted under 35 U.S.C. 154(b) by 0 days.

(21) Appl. No.: 09/149,434

(22) Filed: Sep. 8, 1998

(51) Int. Cl.[7] .................................................. G06F 11/00
(52) U.S. Cl. ........................ 702/183; 702/182; 702/185; 714/25; 714/46
(58) Field of Search .................................. 702/121, 181, 702/182, 183, 184, 185; 714/25, 38, 46, 703, 704

(56) References Cited

U.S. PATENT DOCUMENTS

| | | | |
|---|---|---|---|
| 5,036,479 | * | 7/1991 | Prednis et al. ........................ 702/121 |
| 5,223,788 | * | 6/1993 | Andreano et al. ...................... 714/25 |
| 5,463,766 | * | 10/1995 | Schieve et al. ........................ 714/46 |
| 5,602,761 | * | 2/1997 | Spoerre et al. ........................ 702/183 |
| 5,627,964 | * | 5/1997 | Reynolds et al. ....................... 714/46 |
| 5,659,680 | * | 8/1997 | Cunningham et al. ................. 714/25 |
| 5,805,796 | * | 9/1998 | Finch et al. ............................ 714/40 |
| 6,000,040 | * | 12/1999 | Culley et al. .......................... 714/31 |

* cited by examiner

Primary Examiner—Marc S. Hoff
Assistant Examiner—Bryan Bui

(57) ABSTRACT

The present invention is directed to an automated diagnostic tool having a soft structure architecture that can be easily and quickly used to troubleshoot systems and subsystems, i.e., assemblies, on aircraft such as the AH-64 helicopter. The tool includes a laptop computer loaded with a troubleshooting software program, which evaluates assembly status messages traveling on a 1553 digital communications bus that links the aircraft systems and subsystems together. The tool obtains the messages by listening on the 1553 bus. The program includes listings of the assemblies, a set of pass/fail tests for evaluating the status information, and a set of relationships that numerically correlate test outcomes with different assemblies. Based on the test results and the relationships, the tool indicates which assemblies are the most likely cause of equipment malfunctions indicated by the test outcomes. The assemblies, tests, and the relationships between the tests and the assemblies are independent of each other, and the relationships are reversibly traceable.

27 Claims, 38 Drawing Sheets

SSA File Format

| Adaption Rate |
|---|
| Max Metric Level |
| # of Replaceable Assemblies |
| # of Automated Tests |
| # of Relationships |
| # of Automated DAQ & Tests |
| Hypothesis[1] |
| Hypothesis[2] |
| . . . . |
| Hypothesis[N] |
| Query[1] |
| Query[2] |
| . . . . |
| Query[N] |
| Relationship[1] |
| Relationship[2] |
| . . . . |
| Relationship[N] |
| MessageID[1] |
| MessageID[2] |
| . . . . |
| MessageID[N] |
| Test Element[1] |
| Test Element[2] |
| . . . . |
| Test Element[N] |
| Test Block[1] |
| Test Block[2] |
| . . . . |
| Test Block[N] |
| Active Bias/Acceptance Level |

FIG. 2C

Test Element[x]

| Test Element Name |
|---|
| (Msg) Index − DEC Format |
| Word Number |
| Mask Value |
| Discrete/Fail Value |
| High Value |
| Low Value |
| Conversion Factor |
| Representation |
| Range Bias Factor |
| Test Type |

FIG. 2D

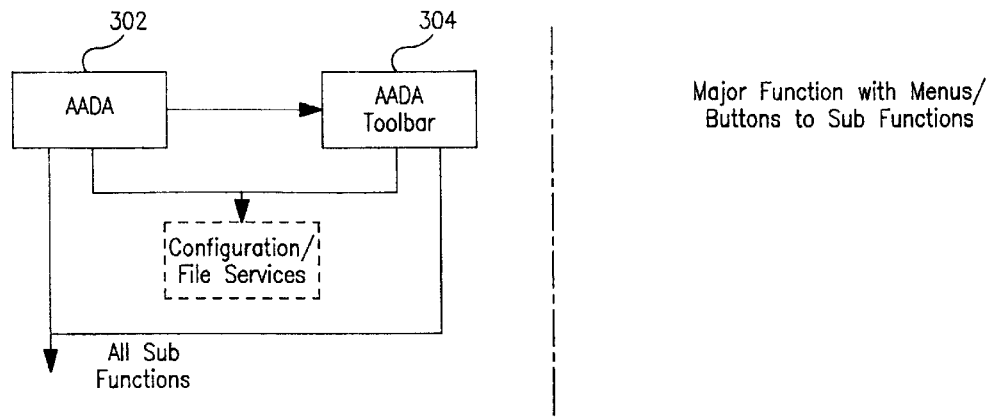

Major Function with Menus/
Buttons to Sub Functions

FIG. 3A

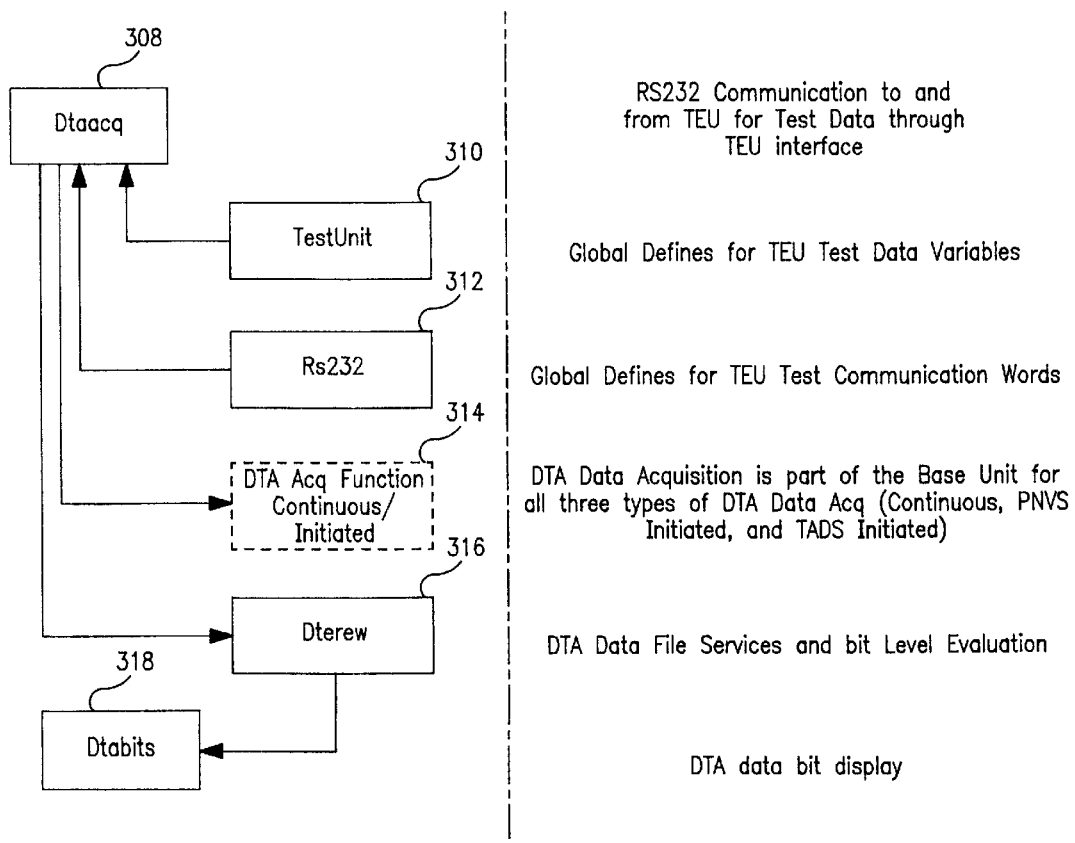

RS232 Communication to and
from TEU for Test Data through
TEU interface

Global Defines for TEU Test Data Variables

Global Defines for TEU Test Communication Words

DTA Data Acquisition is part of the Base Unit for
all three types of DTA Data Acq (Continuous, PNVS
Initiated, and TADS Initiated)

DTA Data File Services and bit Level Evaluation

DTA data bit display

| 6th Digit | | 5th Digit | | | 4th Digit | | | 3rd Digit | | | 2nd Digit | | | 1st Digit | | |
|---|---|---|---|---|---|---|---|---|---|---|---|---|---|---|---|---|
| 0 | | 6 | | | 2 | | | 4 | | | 7 | | | 5 | | |
| Bit | X | 4 | 5 | 6 | 7 | 8 | 9 | 10 | 11 | 12 | 13 | 14 | 15 | 16 | 17 | 18 | 19 |
| Status | X | 0 | 1 | 1 | 0 | 0 | 1 | 0 | 1 | 0 | 0 | 1 | 1 | 1 | 1 | 1 | 0 | 1 |
| Mux Database/AADA Tool Bit | | 0 | 1 | 2 | 3 | 4 | 5 | 6 | 7 | 8 | 9 | 10 | 11 | 12 | 13 | 14 | 15 |

FIG. 29

[ *RC15_14.SSA* ]

Diagnostic Data of 2/19/97

Adaption Rate = 1.50000000000000E-0001

Max Metric Level = 9.00000000000000E-0001

Number of Replaceable Assemblies = 14

Number of Automated Tests = 10

Number of Relationships = 16

Number of Automated DAQ&Test = 5120

[ *Assemblies tab* ]

Hypothesis Names

[ *The Hypothesis Name corresponds to the Assembly Name entry. The Fail Rate entry is shown below as the Metric. The Index corresponds to the item's order in the list of entered assemblies.* ]

Hypoth[4] = BIT INITIATE Indicates that BIT is Initiated
   Metric = 1.00000000000000E-0006
   Index = 4

Hypoth[5] = BIT INITIATE Indicates that BIT is Not Initiated
   Metric = 1.00000000000000E-0006
   Index = 5

Page 26
AADA.DOC
This document applies to Software Versions 1.3 and up unless superseded by a revised version of this document.

FIG. 30A

[ *Test Definition* tab ]

Query Data

[ *The Query Name corresponds to the Test Name entry.*

*If the Exp. Ans. Code (Expected Answer code) is a "1" then the True [Yes] radio button will be selected. If the Exp. Ans. Code is a "2" then the False [No] radio button will be selected. If the Exp.Ans. Code is a "0" then the Value radio button will be selected.*

*The Expected High value corresponds to the Parametric Query High value entry and the Expected Low value corresponds to the Parametric Query Low value entry.*

*If Automatic Code is a "1" then the Automatic check box is checked meaning this is an "automatic" test instead of a "manual" test which would require operator intervention. The "manual" tests would have an Automatic Code value of "0".*

*The Index corresponds to the item's order in the list of tests.* ]

Query[1] = BIT Initiate To TEU Indicates BIT is Initiated
   Exp. Ans. Code = 1
   Actual Answer = 0
   Index = 1
   Evoked = 0
   Expected High = 0.00000000000000E+0000
   Expected Low = 0.00000000000000E+0000
   Automatic Code = 1

Query[2] = BIT Initiate To TEU Indicates BIT is Not Initiated
   Exp. Ans. Code = 1
   Actual Answer = 0
   Index = 2
   Evoked = 0
   Expected High = 0.00000000000000E+0000
   Expected Low = 0.00000000000000E+0000
   Automatic Code = 1

FIG. 30B

*[ Create Relations tab or viewed on the Check Relations tab ]*

Relationships

*[ The Hypothesis Name corresponds to the Assembly Names entry.*

*The Query Name corresponds to the Test Names entry.*

*The Positive Likelyhood entry corresponds to the Pos entry. The Negative Likelyhood entry corresponds to the Neg entry. ]*

Hypoth : BIT INITIATE Indicates that BIT is Initiated
Query : BIT Initiate To TEU Indicates BIT is Initiated
   Positive Likelyhood = 1.00000000000000E+0000
   Negative Likelyhood = 1.00000000000000E-0003

Hypoth : BIT INITIATE Indicates that BIT is Not Initiated
Query : BIT Initiate To TEU Indicates BIT is Not Initiated
   Positive Likelyhood = 1.00000000000000E+0000
   Negative Likelyhood = 1.00000000000000E-0003

*[ Message Definition tab ]*

Message IDs

*[ The Msg ID entry corresponds to the Message Name entry and is presented in RT format.*
*The Index entry corresponds to the Dec format Message Number value. ]*

Msg_ID[2] = 4R4   W30
   Index = 8350

FIG. 30C

*[ Test Assignment tab (for Query Selection) and Test Definition Screen (for actual Query/Test entry) ]*

*[ A Test Element is almost identical to a Test Block except it has a Test Name assigned to it for reference purposes. The Test Element is a Test Block that had an Element Name entered for it and then the 'E' (Element) button was pressed on the Test Definition Screen which caused that test to be saved as an Element. ]*

Test Elements

*[ Test Element name is the saved Element Name. Index is the <u>DEC</u> format Message Number value. Word Number is the word number to process within the given Message Number. <u>NOTE: The word number in the SSA files will be one less than the actual word number used due to a "peculiarity" in the DLL file used!!</u> Mask Value is the <u>integer</u> format value for the BIT Mask which is normally represented/used in <u>hex</u> format. (i.e., -32768 dec is FFFF8000 hex but the 'FFFF' is not used.) Discrete Value is the Fail Value. The High Value, Low Value, Conversion, Representation, and Range Bias entries are used for the Parametric Value or Ranged Value Test Types. Test Type = "0" for Discrete Value tests, "1" for Parametric Value tests, or "2" for Ranged Value tests. The Parametric Value test will fail when the measured value is above the High Value or below the Low Value while the Ranged Value test will fail when the measured value is between the High Value and the Low Value.*

*In the Test Block tests, the Query Index corresponds to the Index value for the associated Query. Group Number identifies which AND/OR "group" that test is part of and defaults to "1". And (1)/Or (0) identifies whether the given test will be "And'ed" or "Or'd" with any related tests. ]*

```
Test Element[1] = BIT Initiate to TEU indicates BIT is Not Initiated
    Index = 8350            [ 4R4   W30 ]
    Word Number = 19        [ 20 ]
    Mask Value = -32768     [ 8000 ]
    Discrete Value = 0      [ 0000 ]
    High Value =  0.00000000000000E+0000
    Low Value =   0.00000000000000E+0000
    Conversion =  0.00000000000000E+0000
    Representation = 0
    Range Bias =  0.00000000000000E+0000
    Test Type = 1
```

Test Blocks

```
Test Block[52] Query Index = 1
    Msg Index = 8350        [ 4R4   W30 ]
    Word Number = 19        [ 20 ]
    Group Number = 1
    Mask Value = -32768     [ 8000 ]
    Discrete Value = -32768 [ 8000 ]
    High Value =  0.00000000000000E+0000
    Low Value =   0.00000000000000E+0000
    Conversion =  0.00000000000000E+0000
    Representation = 1
    Range Bias =  0.00000000000000E+0000
    Test Type = 0
    And (1)/Or (0) = 1
```

FIG. 30D

Test Block[53] Query Index = 2
   Msg Index = 8350       [ 4R4   W30 ]
   Word Number = 19    [ 20 ]
   Group Number = 1
   Mask Value = -32768   [ 8000 ]
   Discrete Value = 0     [ 0000 ]
   High Value = 0.00000000000000E+0000
   Low Value = 0.00000000000000E+0000
   Conversion = 0.00000000000000E+0000
   Representation = 1
   Range Bias = 0.00000000000000E+0000
   Test Type = 0
   And (1)/Or (0) = 1

Active Bias = 6.50000000000000E-0001

FIG. 30E

| Assembly | LKlyhd |
|---|---|
| T1 A5 A1 Laser Transmitter Unit | 0.93 |
| T5 Laser Electronics Unit | 0.83 |
| | |

FIG. 31

AUTOMATED DIAGNOSTIC SYSTEM

BACKGROUND OF THE INVENTION

1. Field of the Invention

The present invention relates generally to diagnostic systems for evaluating complex systems and subsystems, and in particular for diagnosing electronic, mechanical, and electromechanical subsystems.

2. State of the Art

Defense development is evolving more and more into a component integration, rather than a detailed design task. Commercial equipment, software, and third party objects (including software objects such as OLE, VCL, etc.) are being combined to create systems which previously would have been created as unique hardware and software design developments. This fundamental change in business approaches is due to several well known factors: 1) Availability of powerful, low cost commercial equipment and software; 2) the exit of many large scale manufacturers from the military marketplace; 3) reduced defense budgets; and 4) a general desire for acquisition reforms.

Diagnostic evaluation of integrated systems is complex. For example, diagnostic evaluation of the Apache AH64 helicopter is conventionally performed by a technician using a technical manual such as the U.S. Army Technical Manual 1-1520-238-T-3, *Aviation Unit Maintenance Manual for Army AH64A Helicopter.* To perform the diagnostic evaluation, the technician uses a Data Entry Keyboard (DEK) and a Heads Out Display (HOD) provided in the cockpit of the helicopter to look at the contents of certain memory locations in the onboard Fire Control Computer (FCC) of the helicopter. Subsystems in the helicopter are connected via a 1553 bus, and are configured so that they periodically put messages onto the 1553 bus that indicate their operational status. The FCC receives these status messages, and stores status information for each of the subsystems on helicopter. When a new status message is received for a specific subsystem, the FCC updates the stored status information for that subsystem using the new message, thus overwriting the old status information.

A technician can troubleshoot the helicopter by inspecting and interpreting the status information stored in the FCC. To do this, the technician selects a memory location in the FCC with the aid of the technical manual, keys in the FCC memory location using the DEK, and views the contents of that memory location as they appear on the HOD. The data appearing on the HOD is raw data corresponding to the selected portion of the subsystem status information stored in the FCC. This process is laborious because the technician can only look at a portion of the stored status information at one time, and must use the Technical Manual to interpret the raw data provided on the HOD to discern which FCC memory location to look at next, and to progressively determine which subsystem element or elements are causing specific problems indicated by fault codes in the raw data. The process of looking up and interpreting the contents of FCC memory locations until the helicopter is successfully diagnosed can take hours.

Other problems complicate this process. For example, when a technician is working on an aircraft whose systems have been updated and improved, he may be using an old manual that does not reflect these changes. Updated technical manuals may not even be available. Furthermore, the troubleshooting procedures outlined in the technical manuals are typically less effective when multiple faults are present in the helicopter, than when a single fault is present.

This deficiency, especially when coupled with the slowness of troubleshooting using the technical manuals, is particularly egregious when the helicopter is used in active warfighting. For example, in a battlefield or battlefront situation, multiple faults due to battle damage are likely to be present, and when the helicopter is urgently needed back at the battlefront to continue fighting, the helicopter must be repaired as soon as possible. In some battle situations, a slow repair process could conceivably put one at a severe tactical disadvantage with respect to one's opponent.

Accordingly, a diagnostic troubleshooting aid is needed that is fast, accurate, relatively inexpensive, easily portable, and which can easily be adapted to not only identify and properly handle upgrades and modifications in the equipment it troubleshoots, but which can also be easily corrected and "taught" when it provides incorrect diagnoses.

SUMMARY OF THE INVENTION

The present invention is directed to an automated diagnostic tool having a soft structure architecture that can be easily and quickly used to troubleshoot and diagnose systems and subsystems. In accordance with an embodiment of the invention, the diagnostic system includes a portable (e.g., laptop) computer loaded with a troubleshooting program, which gathers data regarding the status and performance of systems and subsystems via data cables connected to a 1553 digital communications bus that links the systems and subsystems together.

The program includes listings of the subsystems and their components, a set of pass/fail tests for detecting various status conditions of the subsystems using status messages transmitted by the subsystems to the FCC via the 1553 bus, and a set of relationships that numerically correlate the different status conditions determined by the tests with a probable "health" or "sickness" of the different subsystems and their components. In other words, the test results indicate when the system is not functioning properly, and the relationships indicate, based on the test results, which subsystems and components are likely responsible for the malfunctions.

The program has three attributes that enable the diagnostic tool to be fast, accurate and easily adaptable; first, the systems, subsystems and components, also referred to as "replaceable assemblies", the tests, and the relationships between the tests and the replaceable assemblies are independent of each. In other words, removing or adding one does not affect the function of the others. Second, the relationships between the tests and the replaceable assemblies are numeric in nature. Third, the relationships are reversibly traceable.

BRIEF DESCRIPTION OF THE DRAWINGS

Other objects and advantages of the present invention will become apparent to those skilled in the art from the following detailed description of preferred embodiments, when read in conjunction with the accompanying drawings. Like elements have been designated with like reference numerals.

FIG. 2C shows an outline of an SSA file format.

FIG. 2D shows an outline of a portion of the SSA file format.

FIG. 3A shows major function software modules in accordance with an embodiment of the invention.

FIG. 3B shows software modules for acquiring data in accordance with an embodiment of the invention.

FIGS. 10–29 show display screens in accordance with embodiments of the invention.

FIGS. 30A–30E show a diagnostic file format for use with an embodiment of the invention.

FIG. 31 shows a diagnostic results display window in accordance with an embodiment of the invention.

DETAILED DESCRIPTION OF THE PREFERRED EMBODIMENTS

Figure 1:
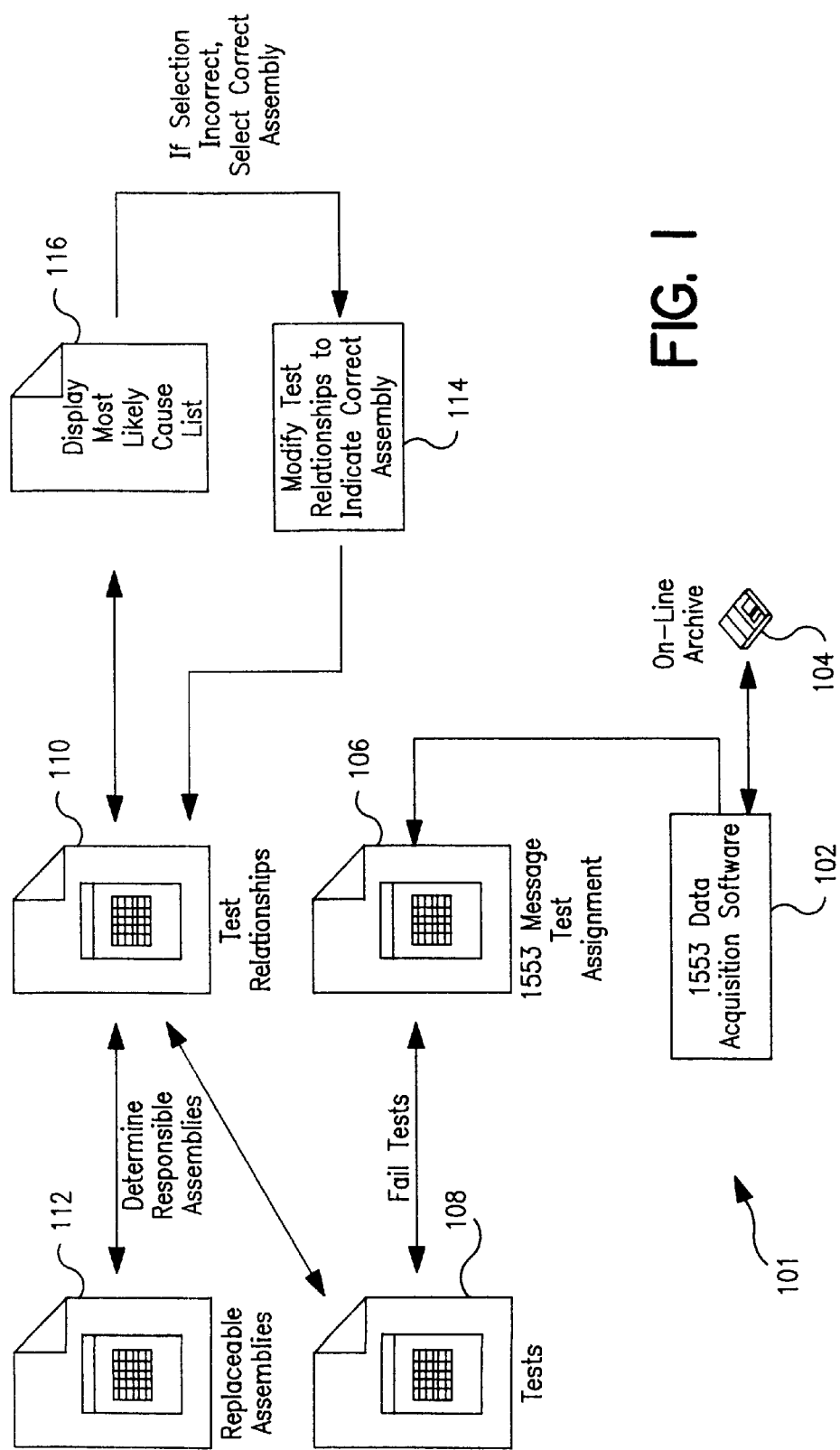
FIG. 1 is a functional overview of an embodiment of the invention.

Effective diagnostic software includes at least 3 elements: (1) items to be replaced; (2) tests and/or inspections; and (3) relationships between tests and the replaceable items. A soft diagnostic structure in which the relationships between the tests and the items to be replaced are completely independent of each other, is desirable.

The data independence of a soft diagnostic structure provides many benefits, such as "Data Based Programming" and "Auto Adaption". Data Based Programming is the development of a functional shell program which performs a particular type of task for a wide range of applications. A spreadsheet is a good example of Data Based Programming. A spreadsheet does nothing until one adds data to it. Due to the data independence inherited from soft structure methodologies, diagnostic software can be created which is targeted for a specific platform through the data loaded via an external file. Data Based Programming is made possible by allowing for the use of Generic Diagnostic Shells, to which one can simply add data in order to develop platform diagnostic capability.

Auto Adaption is an automated alteration of the diagnostic data that is based on the actual cause of failure, as opposed to the indicated or presumed cause of failure. In the system of the present invention, an operator selects the actual cause of failure from a list and the system automatically alters the diagnostic system to include the replaceable assembly indicated by the operator as the correct source of failure, whenever the same pattern of test failures occurs. Support of Auto Adaption allows for mis-isolations (i.e., erroneous narrowing of possible fault sources to a subset of assemblies), false alarms, and design errors to be variously identified, trapped (where appropriate), and corrected for within the diagnostic system.

Soft Structured Architectures have several attributes to support both Data Based Programming and Auto Adaption, including: (1) replaceable assemblies, tests, and relationships between them which are independent of each other, i.e., "data independent"; (2) relationships between the tests and the replaceable assemblies which are numeric in nature; and (3) reverse traceability of the relationships.

Independence of the three basic components of the diagnostic system (i.e., the assemblies, tests, and relationships) can be determined in the following manner. If one can eliminate any replaceable assembly, test, or relationship without affecting the operation of other replaceable assemblies, tests, or relationships, then the system is data independent.

Numeric relationships are important for two reasons; Quantifiable Operation and Relationship Independence. Non-numeric relationships are possible and are actually the norm rather than the exception in conventional systems. IF-THEN-ELSE statements are non-numeric relationships and demonstrate associated deficiencies. For example, in an "expert system", elimination of any relationships, tests, and replaceable assemblies also eliminates all relationships, tests, and replaceable assemblies which are further down the IF-THEN-ELSE tree. Even in a Production Rules system, where relationship independence is assumed, elimination of any rule may result in the short circuiting of a critical variable which is used in many other rules. This is typically where Production Rule systems fall apart. As long as one adds relationships, replaceable assemblies, or tests, the system works fine and seems to be data independent. However, eliminating even a single relationship, assembly, or test can cause the entire system to fail.

An exemplary numeric relationship has the following features: (a) support of a "1 test-1 assembly selection" process; (b) support of a "1 test-1 assembly deselection" process; and (c) independently works for both the positive (selection) and negative (deselection) process. "1 test-1 assembly" selection and deselection is used to support the real life occurrences of single tests which unambiguously indicate the failure or valid operation of a specific assembly.

To enable the diagnostic system to adapt, both positive and negative selection/deselection processes are supported. One needs to be able to deselect assemblies which could not have caused a particular test to fail, as well as select those which were most probably the cause of failure. Conversely, if a particular test has been passed, one needs to be able to deselect those assemblies which would have caused the test to fail. The opposite process, selection, does not provide any additional information concerning the assembly that is most likely to have caused failure of the test.

Reverse traceability provides the mechanism for performing Auto Adaption. The correct selection (recommended replacement assemblies or repair processes) is traceable back to the actual failed tests or user input, so that the test relationships of the correct selection can be modified to support correct selection in the future, and so that any incorrect selection relationships can be modified to reduce their likelihood of selection.

In other words, a method is needed for changing the numeric relationships so that incorrectly recommended fixes are eliminated and correctly indicated fixes are supported. For this to work, all affected assemblies are traced back through their relationships to the failed and passed tests. This includes assemblies which may not have been indicated by any test but are found later to be the actual cause of failure.

Conventional diagnostic software is usually composed of hard coded tests and structures which handle tests and relationships of the tests to replaceable items, to select which item should be replaced. Tests include hard coded sequential steps which determine whether a test is failed or passed. The relationships have a tree structure with either a single test or a list of components. For example, a power supply test may follow the sequence described by the following pseudocode;

(1) sample voltages;
(2) digitize voltages and place in dVolt;
(3) if dVolt<OFF4, then
    execute Example_Power_Supply_Failed
    else
    perform next test.

One problem with hard coded diagnostic systems is that they assume that the diagnostic system is perfect and that the system's creator is all knowing. Large systems, especially complex "multiple points of control" systems, are often convoluted and difficult to diagnose. System activity associated with test failures can cause unanticipated changes in the system which result in other, seemingly non-related tests to fail. Few commercially available diagnostic shells have the capability of data independence. Elimination of any replaceable assembly, test, or test relationship is either not allowed, or results in a requirement to recompile the entire system.

There are a number of methods available for implementing a soft structured approach. These methods include, for example, Production Rules; Genetic Algorithms; Minimal Matrix; Parametric Matrix; and Intersectional Matrix. The Intersectional Matrix approach is more accurate "out of the box" than the Parametric Matrix approach, but requires significantly more analysis than the Parametric Matrix approach and takes longer to "build" diagnostic files.

An embodiment of the invention uses the Parametric Matrix approach. It is difficult for non-matrixed approaches to support numeric relationships. Matrix approaches can more easily provide reverse traceability, and complete data independence.

Production Rule systems were the first diagnostic structures to use a soft structured approach. Production Rule systems contain IF THEN ELSE structures, but they are executed in an almost random order depending on the results of all IF THEN ELSE structures already executed. Variables are altered based on the results of each IF THEN ELSE test and the values of the variables are used to determine which rule is executed next.

Non-numeric relationships are possible and are actually the norm rather than the exception in conventional systems. IF-THEN-ELSE statements are non-numeric relationships and demonstrate associated deficiencies. For example, in an "expert system", elimination of any relationships, tests, and replaceable assemblies also eliminates all relationships, tests, and replaceable assemblies which are further down the IF-THEN-ELSE tree. Even in a Production Rules system, where relationship independence is assumed, elimination of any rule may result in the short circuiting of a critical variable which is used in many other rules. This is typically where Production Rule systems fall apart. As long as one adds relationships, replaceable assemblies, or tests, the system works fine and seems to be data independent. However, eliminating even a single relationship, assembly, or test can cause the entire system to fail.

Genetic Algorithms represent the classic "learning" algorithms such as those used in the laundry list of Neural Net types which have become prevalent in the Artificial Intelligence (AI) community. The overhead involved in adapting such systems, and the inability to qualify the "goodness" of such systems, makes them less desirable. "Goodness" represents a qualitative measure of how well the diagnostic system performs.

Neural Networks support numeric relationships abstractly, but fail to satisfy the requirement of reverse traceability. Auto Adaption can be performed in a Neural Network, but requires the collection and relearning of all diagnostic episodes over the life of the system on a continual basis. Genetic Algorithm Neural Nets (GANN's) do not have this problem, per se, as long as the adding of assemblies and tests results in automatic creation of relationships. GANN solutions, however, eliminate the path to all other possible solutions except the system selected solution.

In accordance with an embodiment of the invention, a Diagnostic Aid (DA) tool can be used to collect and analyze data from a 1553 data bus on an aircraft. The collected data can be used to determine which components of the aircraft have failed diagnostic tests.

The DA tool can be used to diagnose any system that uses the 1553 bus, given a diagnostic file that identifies replaceable units in the system, includes tests to perform using information gathered from the 1553 bus, and includes relationships between the tests and the replaceable units. Thus, the DA tool can be used to diagnose, for example, an Apache AH64 "A" model helicopter when provided with an appropriate diagnostic file for that helicopter, and operational data about an individual helicopter to be diagnosed. The operational data is typically gathered by listening to message traffic on the individual helicopter's 1553 bus. The DA tool can also be used to diagnose other helicopters, aircraft, land vehicles, fixed emplacements, etc. that use the 1553 bus, when provided with the appropriate diagnostic files.

FIG. 1 shows a functional overview 100 of the DA diagnostic tool in accordance with an embodiment of the invention. As shown in FIG. 1, data from the 1553 bus of the helicopter comes in over the line 101, and is processed by the data acquisition software element 102. Status information regarding various systems and subsystems in the helicopter can be gleaned by listening to traffic on the 1553 bus instead of accessing memory locations in the FCC, because each system and subsystem periodically sends messages containing status information to the FCC. These messages also contain identifiers which indicate the source and general content of the message, and can thus be selectively identified and copied by the diagnostic tool as it listens to traffic on the 1553 bus.

Status information is extracted from the overheard 1553 bus traffic and passed on to the Test Assignment software element 106, which matches the extracted information with specific tests. In the Tests software element 108, the tests are applied to the extracted status information, and the test results are interpreted using the Test Relationships software element 110 to determine which of the replaceable assemblies listed in the Replaceable Assemblies software element 112 are likely responsible for specific test failures, i.e., which replaceable assemblies are responsible for the specific helicopter malfunctions indicated by the test results. Software element 116 displays a list of replaceable assemblies which are most likely responsible for the detected helicopter malfunctions. A technician using the diagnostic tool can correct the list of likely assemblies. For example, if the technician knows that one of the replaceable assemblies listed is not responsible, or if for example he knows that one of the listed assemblies is wholly responsible, he can correct the displayed list to reflect this. The correction causes software element 114 to modify the test relationships so that the diagnostic tool will in effect remember the correction, and display the corrected list the next time the same fault conditions occur. Data acquired from the 1553 bus can be stored in an on line archive 104 for later use.

Figure 2A:
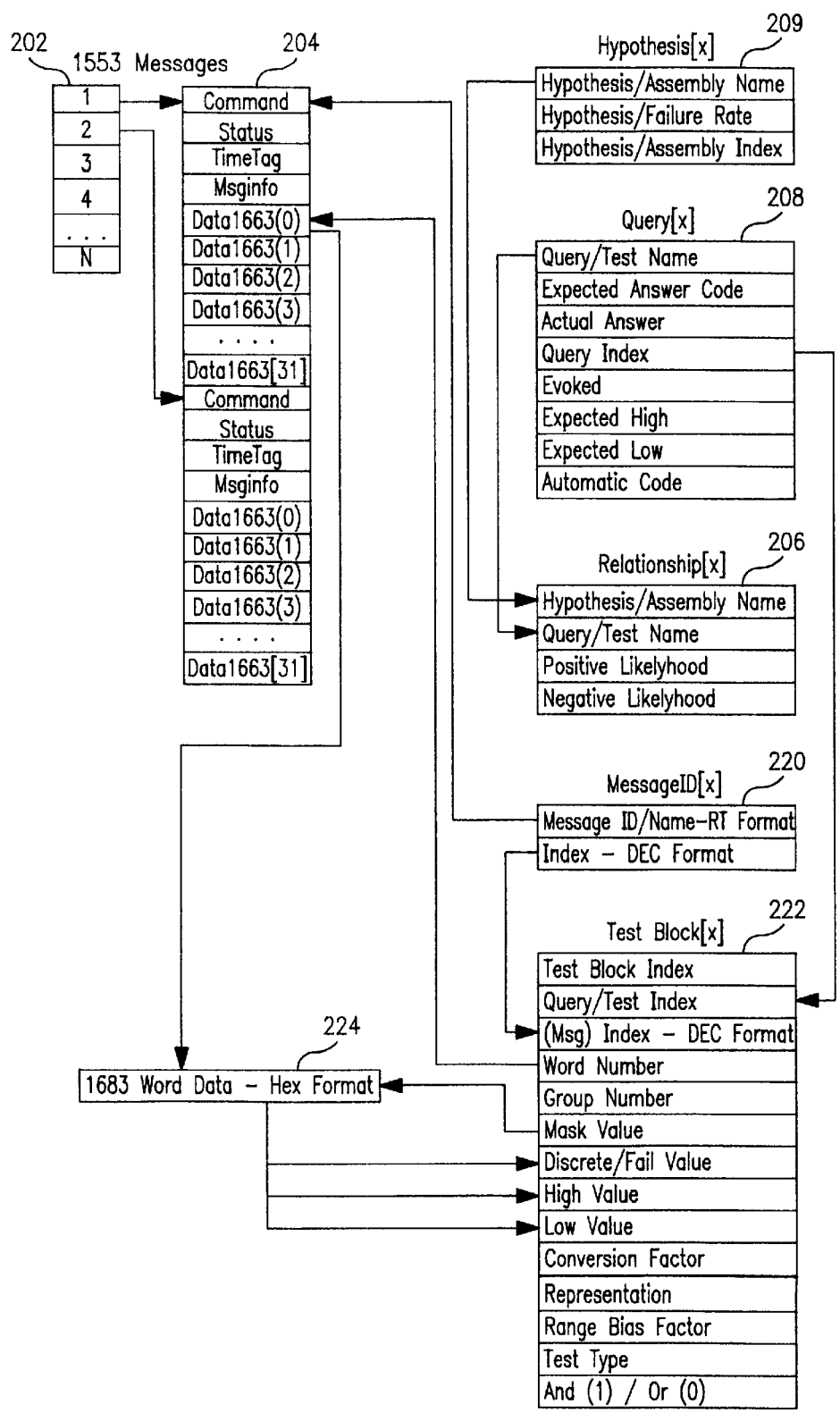
FIG. 2A shows a data structure linking replaceable units with tests via relationships.

FIG. 2A shows a data structure for use with an embodiment of the invention. Element 202 is a series of 1553 message blocks, each having a format 204 which can begin with a Command field, and can end with a Data1553[31] field. For example, the format 204 shows two identical formats corresponding to the first 2 message blocks of element 202. The Command field of the format 204 identifies the type of message, and the data fields Data1553[1 . . . 31] can contain status information regarding a particular assembly when the message block is a status message.

Element 206 is a relationship block that defines a relationship between an Assembly (also referred to as a "Hypothesis") and a Test (also referred to as a "Query"), and further includes Positive and Negative Likelihood values characterizing the relationship between the Assembly and the Test. There is a Query element 208 for each Test, which helps define the Test. The Query element 208 can point to one or more Test Blocks 222, which specifically define components of the Test such as mask values to be compared with selected portions of the 1553 messages. The message element 220 identifies particular 1553 messages to be associated with specific Test Blocks 222.

Thus, when given one of a query, a test/relationship, and an assembly, the DA tool can discern which of the others of the queries, tests/relationships, and assemblies the given one is linked to, thus helping to satisfy the traceability requirement.

FIG. 2C shows an outline of an SSA file format. An example SSA file is shown in FIGS. 30A–30E and described further below. FIG. 2D shows an outline of a Test Element that is part of the SSA file format, and the Test Block 222, Relationship 206, Query 208 and Hypothesis 209 elements shown in FIG. 2A likewise correspond to portions of the SSA file format.

Figure 2B:
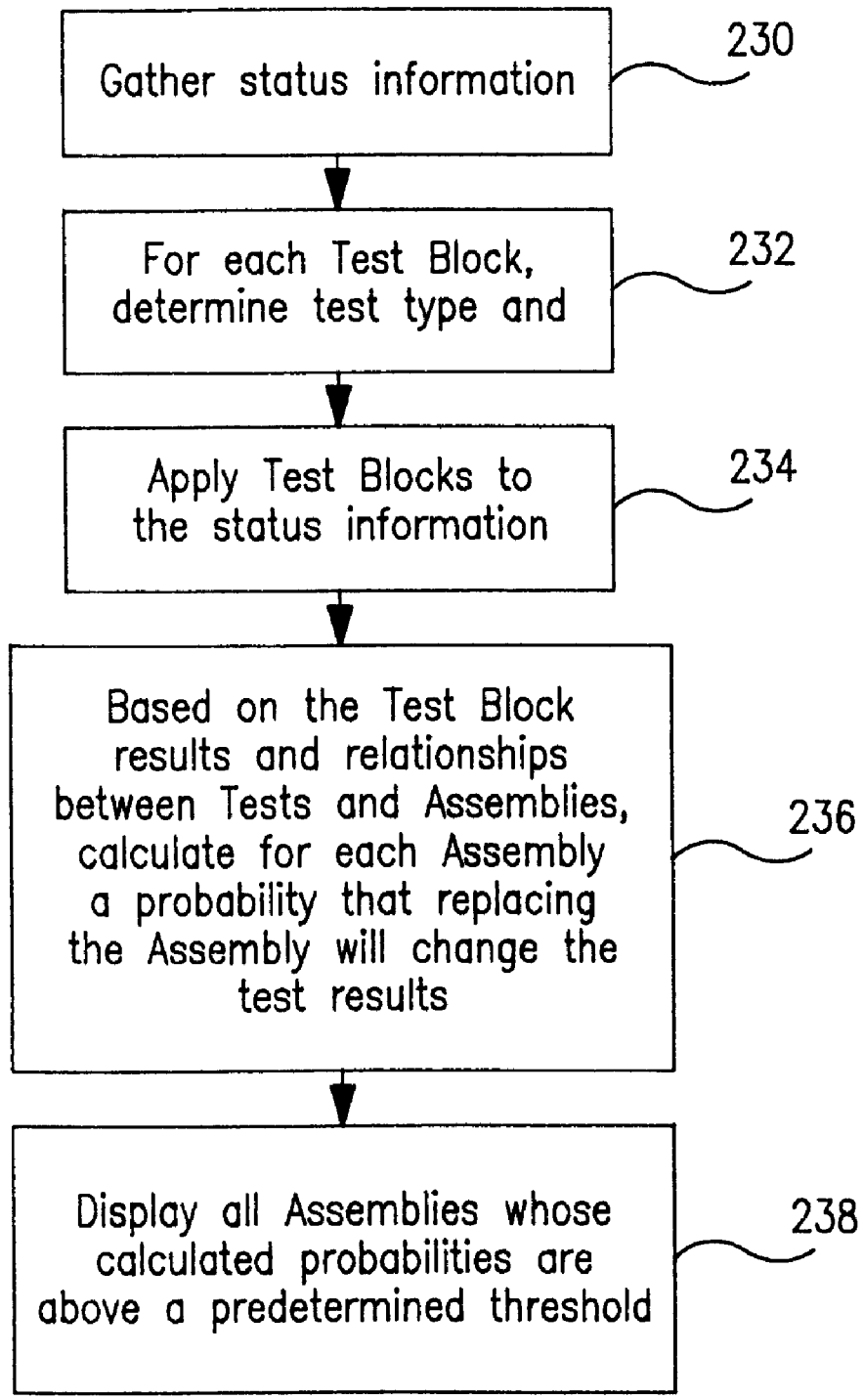
FIG. 2B shows a general flowchart in accordance with an embodiment of the invention illustrating how the tests, relationships, and assemblies defined by the data structures shown in FIGS. 2A, 2C & 2D are used to generate a listing of assemblies that should likely be replaced.

FIG. 2B shows a general flowchart illustrating how the Tests, Relationships, and Assemblies defined by the data structures shown in FIGS. 2A, 2C & 2D are used to generate a listing of Assemblies that should likely be replaced. In particular, FIG. 2B shows that in step 230, status information is gathered, for example from a 1553 data bus or other suitable bus. In step 232, for each Test Block 222, the test type is determined. In step 234, the Test Blocks 222 are applied to the gathered status information to obtain test results. In step 236, the test results are used together with defined relationships between the Tests and Assemblies to calculate for each Assembly a probability that replacing the Assembly will change the test results, for example alleviate the symptoms indicated by the test results. In step 238, all Assemblies are displayed whose calculated probabilities are above a predetermined threshold value (e.g., 0.8).

FIG. 3A shows software modules of the DA tool including a panel interface 302 and a toolbar interface 304. FIG. 3B shows software modules of the DA tool including a data acquisition module 308, linked to a test unit module 310, an RS 232 communication module 312, a DTA data acquisition module 314, a raw data display module 316 and a data bits display module 318. The modules shown in FIG. 3B allow the DA tool to receive data directly from a subsystem instead of listening on the 1553 bus. For example, the DA tool can be connected via an RS 232 bus connection with the target acquisition and designation system/pilot night vision system) TADS/PNVS via a TADS Electronics Unit (TEU) to collect information about the TADS/PNVS directly.

Figure 4:
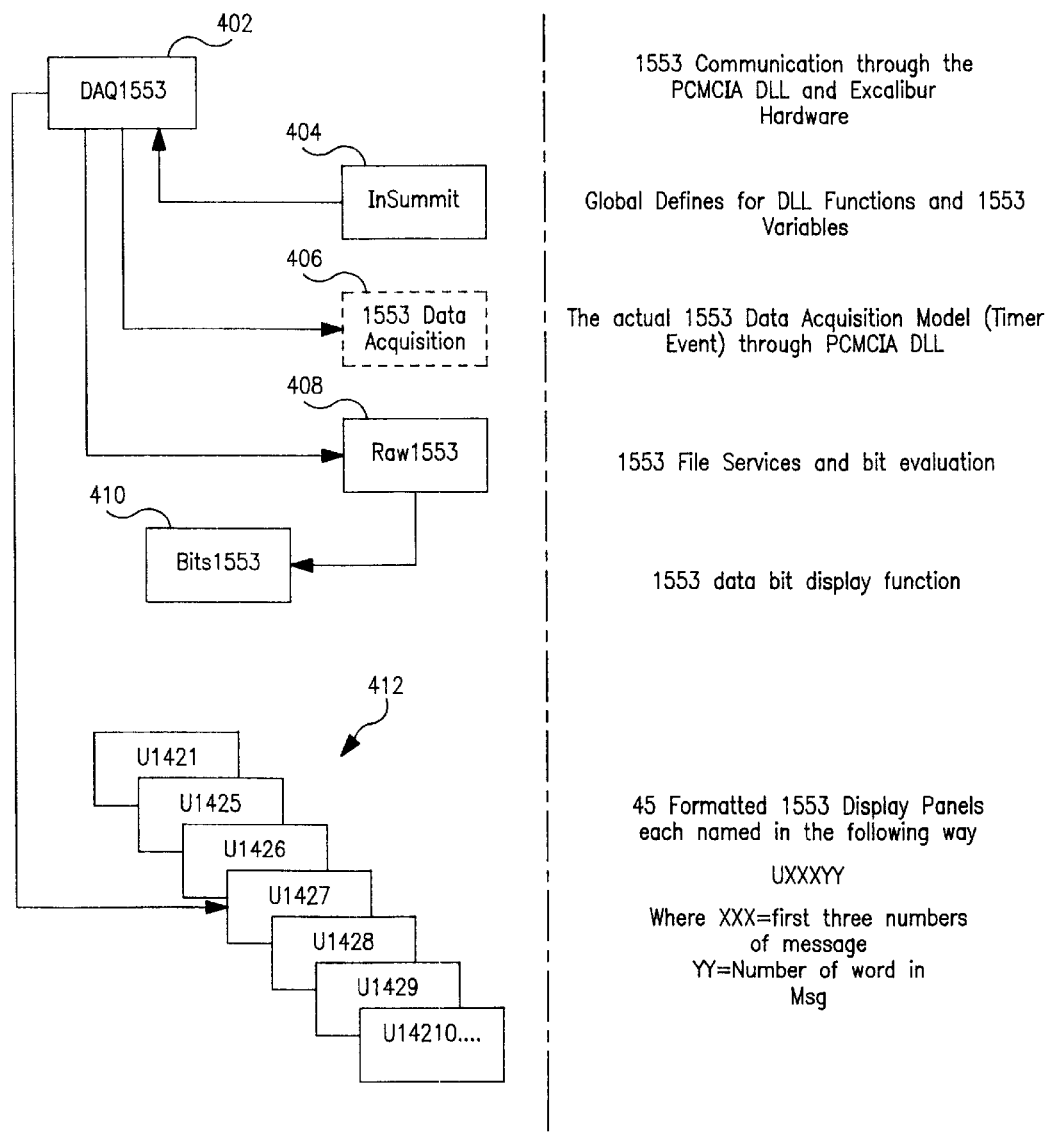
FIG. 4 shows software modules for acquiring data and transporting and displaying the acquired data in accordance with an embodiment of the invention.

FIG. 4 shows software modules of the DA tool for collecting status information via the 1553 bus. The module 402 controls data acquisition from the 1553 bus, and can be activated using a button on the DA toolbar. The data acquisition module 402 is linked to an InSummit module 404 that contains global definitions for variables found on the 1553 bus, an acquisition module 406 that handles the details of extracting status information from 1553 bus traffic, and an evaluation module 408 "Raw 1553" that analyzes extracted data. The evaluation module 408 is in turn connected to a "Bits 1553"module 410, which displays bits on a screen of the DA tool for viewing by the operator. The modules 412 "U1421", "U1425", etc. represent different formats by which the DA tool can display data extracted from the 1553 bus traffic, on screen.

Figure 5A:
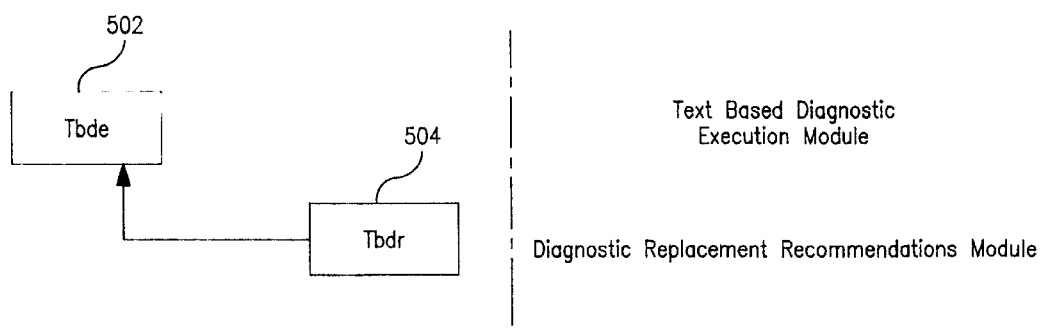
FIGS. 5A, 5B each show a diagnostic execution module in accordance with an embodiment of the invention.
Figure 5B:
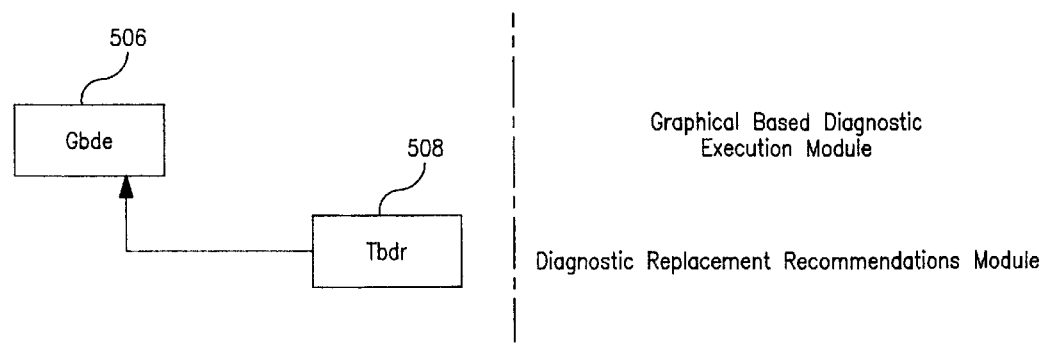

In FIG. 5A, the software module 502 "Tbde" represents a button on the DA toolbar that activates the software module 504 "Tbdr" that shows which assemblies are presumed to be responsible for helicopter malfunctions as indicated by test failures. In FIG. 5B, the software module 506 "Gbde" represents a button on the DA toolbar (and which is also an option on the panel) that activates the software module 508 "Tbdr" to show which tests failed. The display of suspect assemblies can be text-based, e.g., a listing of assembly names, and the display of failed tests can be graphics-based, e.g., a grid of test names.

Figure 6A:
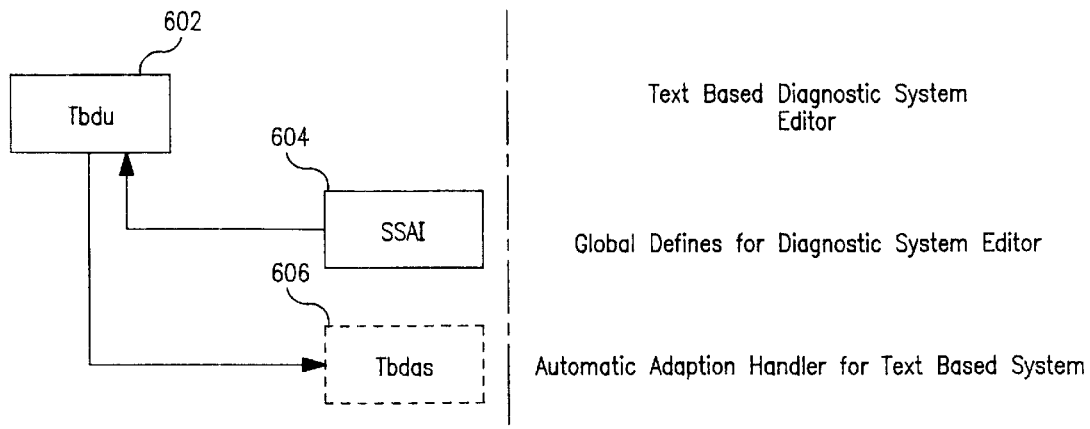
FIGS. 6A, 6B show diagnostic system editor modules in accordance with an embodiment of the invention.
Figure 6B:
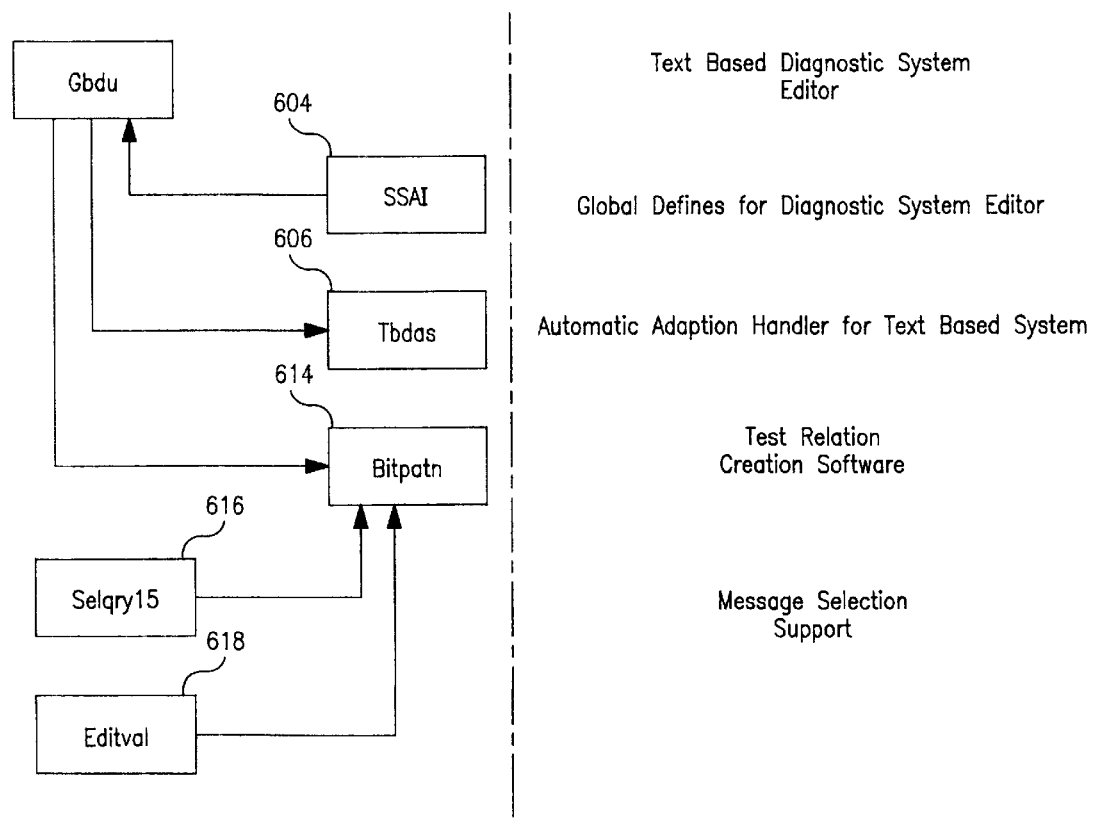

In FIG. 6A, the DA tool software module 602 "Tbdu" is an entry on a panel, via which the software modules 604 "SSAI" and 606 "Tbds" can be accessed or activated. The module 604 contains global definitions for a Diagnostic System Editor to use, and the module 606 handles automatic adaption. In FIG. 6B, the module 608 "Gbdu" is a panel entry, via which the software modules 604 "SSAI", 606 "Tbdas", and 614 "Bitpatn" can be accessed or activated. The module 614 facilitates creation of relationships between tests and assemblies, and the software modules 616 "Selqry15" and 618 "Editval" provide message selection support.

Figure 8A:
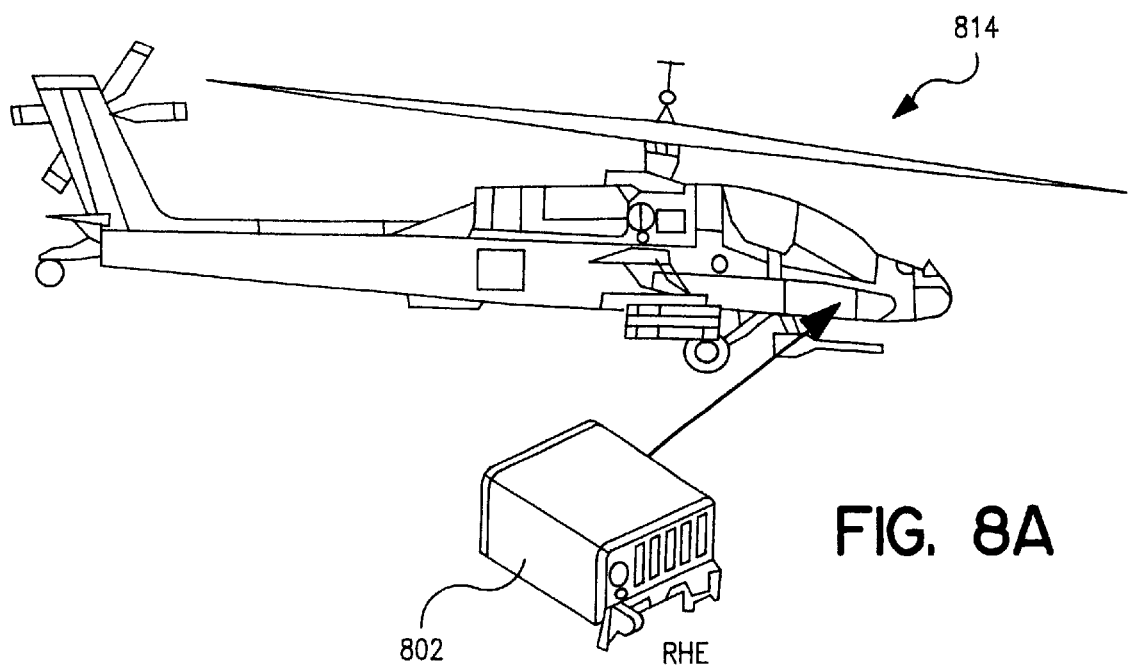
FIG. 8A shows an Apache AH64 helicopter which can be diagnosed in accordance with an embodiment of the invention.
Figure 8B:
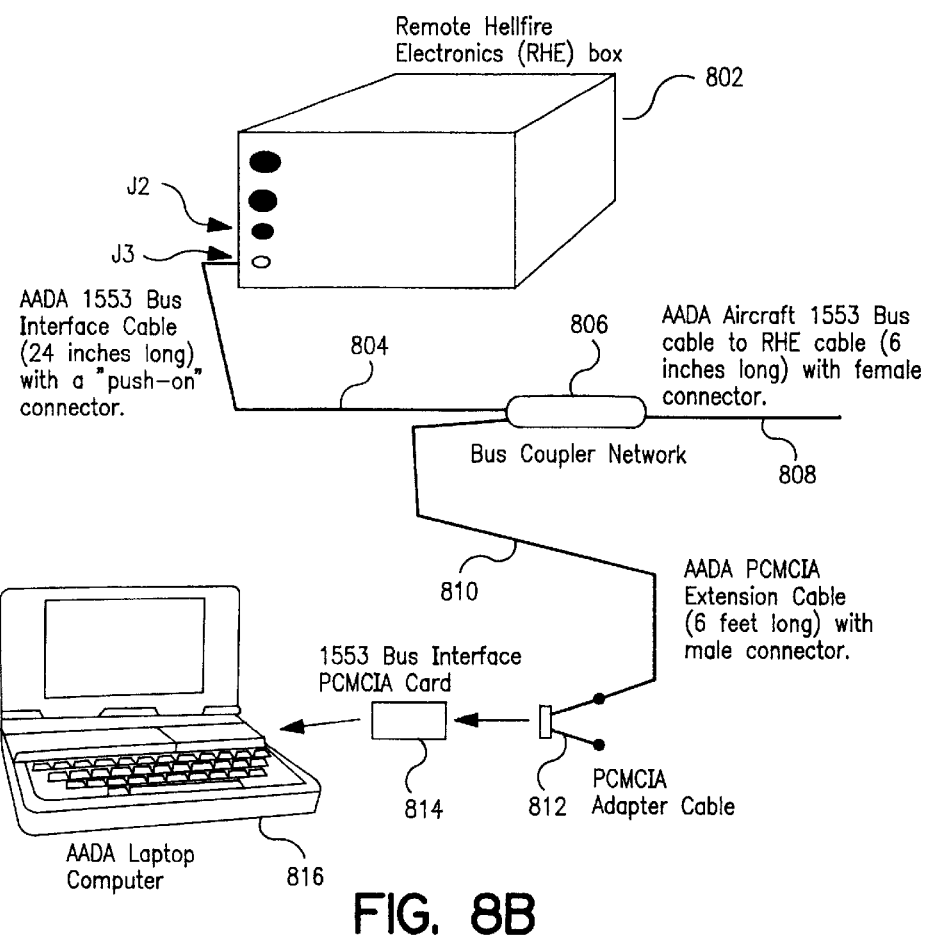
FIG. 8B shows a connection configuration in accordance with an embodiment of the invention.

FIG. 8A shows an Apache AH64 model "A" helicopter 814, and indicates that the Remote Hellfire Electronics (RHE) unit 802 is located in a forward avionics bay of the helicopter 814. In the Apache AH64 model "A" helicopter, the RHE unit 802 is connected to the 1553 bus of the helicopter, and can provide a convenient location to tap the 1553 bus. FIG. 8B shows elements of the DA tool, and how the tool can be connected to the 1553 bus of the helicopter via the RHE unit 802. The DA tool includes a laptop computer 816 with a 1553 bus interface PCMCIA card 814 (for example, EXC-1553PCMCIA-2, manufactured by Excalibur Systems, Inc.), a PCMCIA adapter cable 812, an extension cable 810 approximately 6 feet long, a bus coupler 806, and an interface cable 804 that is approximately 24 inches long. The laptop computer 816 is loaded with the DA diagnostic software and a diagnostic file specific to the Apache AH64 model "A" helicopter.

In normal operation of the helicopter 814, the aircraft 1553 bus cable 808 shown in FIG. 8B is connected directly to the RHE unit 802 via the connector J2, and connects the RHE unit 802 to a channel of the 1553 bus. On the Apache AH64 model "A" helicopter there are two 1553 bus channels, and the other connector J3 connects the RHE unit 802 to the other 1553 bus channel. To connect the DA tool to the 1553 bus, the cable 808 can be disconnected from the connector J2, and the cable 804 can instead be connected to the J2 connector as shown in FIG. 8B. Then, as shown in FIG. 8B, the coupler 806 acts as a junction that connects both the RHE unit 802 and the laptop computer 816 to the 1553 bus of the helicopter 814. The J3 connector can be used instead of the J2 connector.

The RHE unit 802 is a good place to tap into the 1553 bus, because the RHE unit 802 is at the end of the 1553 bus and contains bus terminators. Accessing the 1553 bus at the RHE unit 802 thus insures that there will not be any signal "mirroring" which could be present if the DA tool were to be connected to the 1553 bus at some other point.

On all of the DA tool screens displayed on the laptop computer 816 that have a displayed button labeled "Print", activating that button (for example, by using a mouse to position a cursor on the button and then clicking the mouse) will produce a "screen print" of that window/screen. If there is a list box or text box displayed that has an "elevator" control on it, items that are above/below the window will not be present on the printout.

An overview of the recommended "normal" flow of testing is as follows: first, double check that helicopter cockpit switch settings are correct by loading a diagnostic file such as "BITCHECK.SSA" into the DA tool, acquiring helicopter status data by listening to traffic on the 1553 bus, and then generating a diagnostic report with respect to cockpit switch settings based on the acquired status data. Second, diagnose the helicopter (or, for example, a specific system or subsystem within the helicopter, such as the TADS/PNVS) by loading a diagnostic file for the helicopter such as "APACHEA.SSA" into the DA tool, acquire status data via the 1553 bus, and then generate diagnostic report for the helicopter based on the acquired status data.

Specifically, operation of the DA tool proceeds as follows; first, turn on the DA laptop computer 816. When the laptop computer 816 finishes loading Windows 95™, the SystemSoft CardWizard program's screen will be displayed. Locate the "Close" button which is the one with the "X" in it along the top row of the SystemSoft CardWizard window. Click the "Close" button one time to close the window. To run the DA Tool program, double-click on the icon labeled "DA Tool". There will be two INFO boxes displayed with an OK button on each. The first one will display the Max Block Memory size. Either press the Enter key or click on the OK button to continue. The second INFO box will display the Max Mem Available (the amount of available "virtual" memory). Either press the Enter key or click on the OK button to continue into the program. This will bring up the DA Toolbar which is where everything is done.

This will also cause an icon to be displayed in the lower left of the display which is labeled DA System Menu. This is a menu driven version of the DA Toolbar. This menu driven screen cannot be minimized once it has been activated without causing both the System Menu and the DA Toolbar to be iconized with the DA program's icon but labeled as TDASAV. The DA Toolbar can be iconized by itself without affecting the System Menu. There are additional items on the System Menu under the "Data Management" that are not present on the DA Toolbar. The first two of the options, "ULLS Aviation Data" and "Diagnostic Notes" are not functional at this time. The option labeled "Print Diagnostic Data" will result in a very large printout (about an inch thick or more) of the data in the APACHEA.SSA file. This would not need to be printed under normal usage of the system, but a means to print the data was needed for those extremely rare instances when it would be needed. The data is not printed directly to the user's printer, but rather is sent to a text file for later printing. This file is named DIAGDATA.TXT and will be placed into the C:\DA>directory.

Learning correct fault callouts, i.e., correct associations between test results that indicate a helicopter malfunction and replaceable units in the helicopter that are likely causes of the malfunction, involves using an option on the DA System Menu that is labeled Diagnostics. When Diagnostics is selected by clicking over it, a drop down menu will be displayed with several options. If the Graphical Shell option is selected, a pop-up menu is displayed with three options. The Learn option is used to cause the DA Tool program to "learn" the correct LRU/SRU to call for a given fault should the incorrect LRU/SRU be called out. This "learning" process will be covered in more detail later in this document. To close both the DA Toolbar and the System Menu, either press the Exit button (labeled with a closed door) on the DA Toolbar or select File and then Exit from the System Menu.

Figure 11:
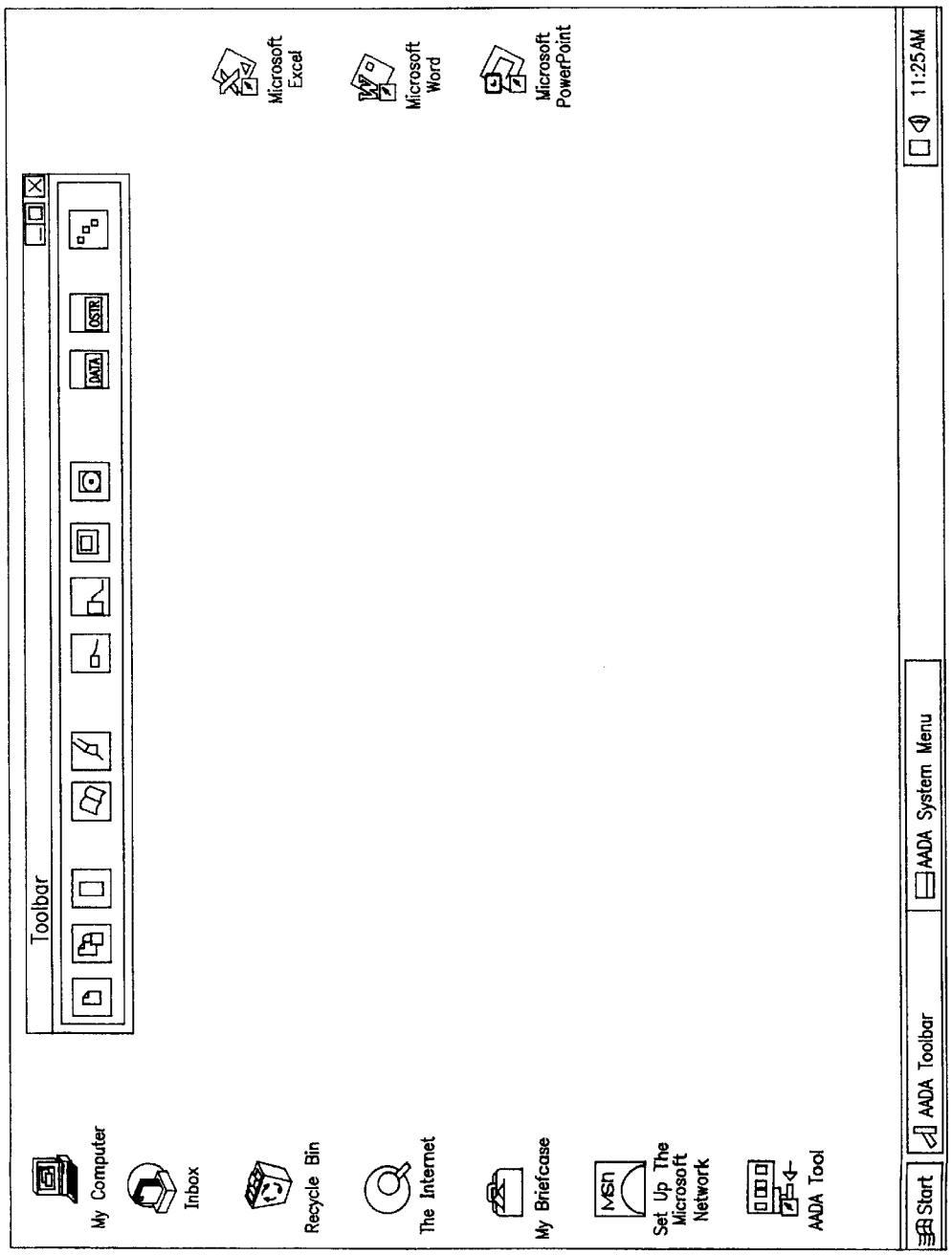

As shown in FIG. 11, the DA tool system opens with a Toolbar showing 12 speed buttons. There is a drop down "hint" that will be displayed below each of the 12 speed buttons when the pointer is held over a button which will display a description of what each button does. Starting on the left, the speed buttons are used as follows: the first button is used to open/load a saved diagnostic data file. The DA tool program will load the APACHEA.SSA file by default if no other file is loaded. Since the APACHEA.SSA file is used during both the DTA and 1553 Bus testing, this will eliminate possible problems of not having the correct file loaded. The second button (from the left) is save a diagnostic data file for a system. File saves will overwrite an existing file that has the same name as the file being saved. The third button closes and exits the DA tool software.

The fourth button is for adding/deleting/editing diagnostic data. Activating the fifth button displays the results of the automated diagnostics. This button has an image of a lightning bolt on it. The sixth and seventh buttons are data acquisition buttons. The sixth button acquires all messages on an attached 1553 bus through a PCMCIA Data Acquisition Card. This button is labeled 1553. The seventh button executes Built-In-Test on the TADS/PNVS (Lockheed Martins targeting, designation, and navigation system on the Apache Attack Helicopter) and acquires the test results through an RS232 Interface. This is very close to the Diagnostic Troubleshooting Aid (DTA) capability provided within the TADS/PNVS system, which is accessed via the TADS Electronics Unit (TEU). Acquiring test results through an RS232 bus requires the use of a TEU Interface box associated cables. This button is labeled RS232.

Button eight is used to activate real time data display of 1553 message information. Button nine provides for Cue'd Response capability, and is used to delete, trap, display, and store data related to detected signals or messages on the 1553 bus that correspond to transient conditions or events within the helicopter. When Cue'd Response is used, capture and storage of data gleaned from messages on the 1553 bus can be initiated when a specified transient event or condition is detected. Buttons ten and eleven provide for the storage and retrieval of the raw form of either acquired 1553 Bus data or acquired DTA TEU data including views of the raw bits for individual messages and words. Button twelve is labeled VER and when pressed displays an "About Box" with the currently installed software version in it.

Prior to running either 1553 A/C Bus testing or DTA testing using the DA tool it is important to insure that all of the helicopter cockpit switches are in their proper position and that the Fire Control Computer (FCC) within the helicopter is sensing the switch settings properly. There is a special system diagnostic data file for this purpose—BITCHECK.SSA. This check is especially useful when it is performed prior to normal testing of the helicopter.

Figure 12:
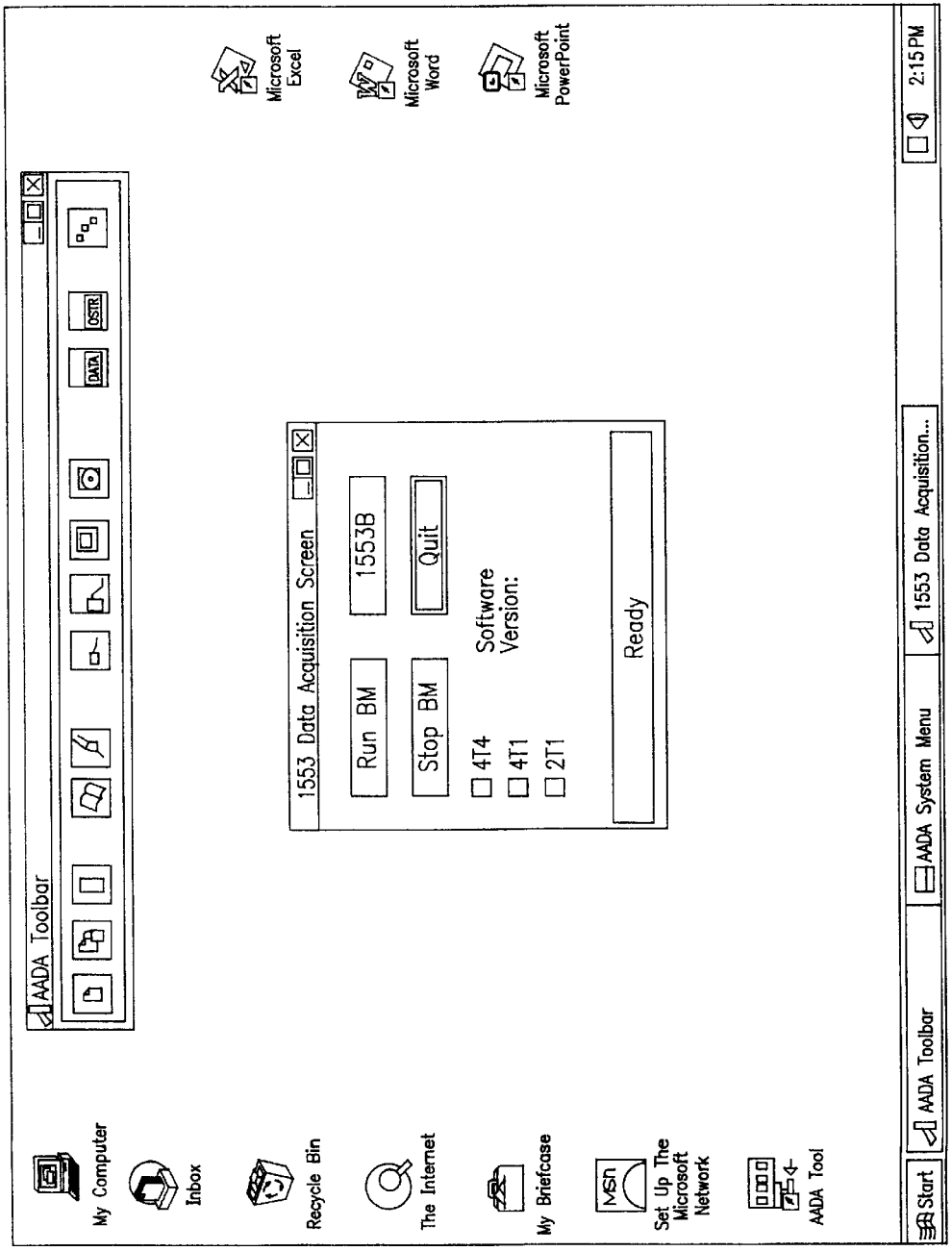

The first step is to press the left most button on the DA Toolbar to load a system diagnostic data file. Select the file named BITCHECK.SSA. The data file is selected using a standard MS Windows™ file dialog box and returns us to the DA Toolbar. Next press the sixth button on the DA Toolbar (labeled 1553) to start the data acquisition process. The 1553 Data Acquisition Screen window shown in FIG. 12 will be displayed. The window has a panel labeled Software Version: which will be blank until 1553 data with TADS TEU data words is being collected or has been collected. This lets the operator know if the DA tool is actually receiving data from the 1553 bus and the TADS TEU. The '4T4', 4T1', and '2T1' checkboxes indicate when those data messages have been or are being received. All of the 1553 data messages are received and processed by the DA tool, but only those messages that are configured in the data file that has been loaded are looked at, and only the 4T4, 4T1, and 2T1 messages are "flagged" as having been received. The 4T4 and 4T1 messages concern TADS/PNVS related messages and the 2T1 message concern the switches.

Data Acquisition is initiated by first selecting what 1553 bus the operator will be collecting data from. The default is 1553B which is shown on the right most button. If the 1553A bus us desired, clicking on this button will charge the button face to 1553A and set up the data acquisition hardware for the 1553A bus protocol. This is a "toggle" type of setting.

Next, depress the "Run BM" button which stands for "Run Bus Monitor Mode". This starts the Data Acquisition Process. Most systems will collect all possible messages which move across the 1553 bus within 50 milliseconds. The system is currently configured to continue data collection and massage processing until either a fault is detected or the 'Stop BM' button is pressed. When a fault is detected, the system will stop the data collection and processing and display the failure information as if the "lightning bolt" speed button had been pressed.

If the operator have an active 1553 bus channel with TADS TEU, the TEU software version will be displayed in the Software Version: box on the 1553 Data Acquisition Screen. If that box remains blank, there is no data flowing from the TADS TEU on the 1553 bus channel selected. If there is 1553 data flowing on the connected bus channel, the 4T4, 4T1, and/or 2T1 check boxes will become checked as the appropriate bus messages are received and processed. if there is no Software Version and no 4T4, 4T1, or 2T1 indications, there is most likely no 1553 bus data flowing on the channel that the DA Tool is connected to. This means that the operator will have to switch to the other 1553 bus channel on the RHE 802. This is done by restoring the J2 connection on the RHE and using the J3 connection per the following procedure:

Stop data acquisition can be stopped by depressing the "Stop BM" button.

Disconnect the Aircraft 1553 Bus cable 808 from the coupler 806.

Disconnect the DA 1553 Bus Interface Cable 804 from J2 of the RHE 802.

Connect the Aircraft 1553 Bus Cable 808 onto J2 of the RHE 802.

Disconnect the other Aircraft 1553 Bus Cable from J3 of the RHE. (There are two Aircraft 1553 Bus Cables, one connected to J2 of the RHE 802 and the other connected to J3 of the RHE 802 during normal operation of the helicopter).

Connect the Aircraft 1553 Bus Cable into the coupler 806.

Connect the DA 1553 Bus Interface Cable 804 into J3 of the RHE.

Press the Run BM button on the DA Tool's screen to re-start the data collection.

The TEU software version should now be displayed in the Software Version: box. If it is still not displayed, the operator can try switching back to the J2 1553 bus channel to see if that corrects the problem. Also, the operator can check to make sure that the cabling is correct and is not kinked. If the problem still exists, there is most likely a 1553 bus problem or failure which may require troubleshooting beyond the scope of the DA tool.

Stop data acquisition by depressing the "Stop BM" button.

In configurations where, as in the Apache AH64 model "A" helicopter, where each system and subsystem of the helicopter sends a status message to the helicopter's FCC on average every 50 milliseconds, the data acquisition process only needs to be run for a few seconds, and 15 seconds should be more than enough time to acquire status information. If there are any faults detected during the 1553 data acquisition processing, the "Text Based Diagnostic Results" window will be displayed, as generally shown in FIG. 31. This is the same window that is displayed if the "Lightning Bolt" speed button had been pressed.

Figure 32:
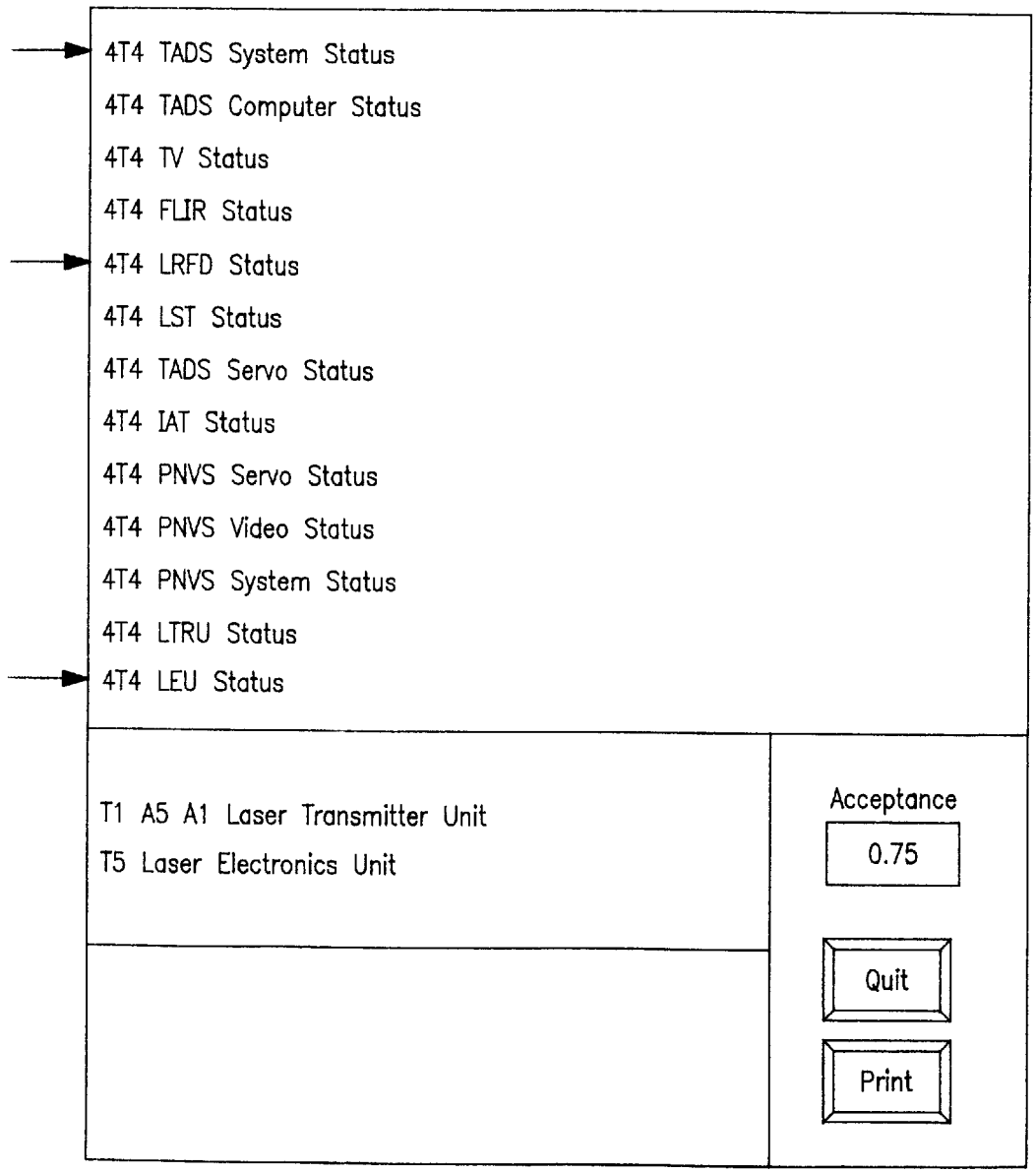
FIG. 32 shows a screen for displaying additional fault information, in accordance with an embodiment of the invention.

Any switches that are incorrectly set (or that the FCC is incorrectly sensing) will be listed in the hypothesis column. Press the "Next>>" button to display the "Graphic Based Diagnostic Execution Screen" for additional fault information. The "Graphic Based Diagnostic Execution Screen" is shown generally for example in FIG. 32, where those entries marked with arrows indicate tests which failed. Alternatively, failed tests can be indicated by highlighting corresponding entries in different colors.

On the "Graphic Based Diagnostic Execution Screen", the incorrectly set switches are highlighted with a cyan bar in the upper left window. The "correct" switch setting for each of the highlighted switches will be given in the lower right window. These switch settings are per the Army Technical Manuals and in some cases there may be a switch setting indicated as incorrect that experience has shown doesn't matter.

To exit from the "Graphic Based Diagnostic Execution Screen", press the Quit button. If a switch is reported by BITCHECK as being incorrectly positioned but upon checking, it is found that the switch in it's "proper" position; cycling the switch out of and back into the "proper" position and re-running BITCHECK should wither clear the problem or could be an indication that the FCC is incorrectly sensing that switch's position. The switch or it's wiring could be faulty.

To re-run BITCHECK, press the "Run BM" button. The TEU software version should be displayed. If there are still any incorrectly set switches, they will again be flagged. Then press the "Stop BM" button. Then press the Quit button. After resetting any incorrectly positioned switches flagged by BITCHECK (or after replacing any faulty switches which were properly positioned by which were incorrectly reported by the FCC), run TADS FD/LS Initiated Bit from the helicopter cockpit. This will cause the TEU to start sending it's 1553 bus information to the FCC which will allow it to be collected during the 1553 A/C Bus Testing process which is normally performed next. To quit the "1553 Data Acquisition Screen", the operator can press the "Quit" button.

The first step in testing and diagnosing the helicopter using the 1553 bus is done by pressing the left most speed button on the DA Toolbar to load a system diagnostic data file. Select the file named APACHEA.SSA. The "A" is added to the Apache filename to designate the "A" model Apache. The data file is selected using a standard MS Windows™ file dialog box and returns the operator to the DA Toolbar. Pressing the third button on the DA Tool program, which will cause the APACHEA.SSA data file to be automatically loaded from the C:DA directory.

Next press the sixth button on the DA Toolbar (labeled 1553) to start the data acquisition process. The 1553 Data Acquisition Screen window will be displayed. The window has a panel labeled Software Version: which will be blank unit 1553 data with TADS TEU data words is being collected or has been collected. This will let the operator know if the DA tool is actually receiving data from the 1553 bus and the TADS TEU. The '4T4', '4T1', and '2T1' checkboxes indicate when those data messages have been or are being received. All of the 1553 data messages are received and processed by the DA Tool. Only those messages that are configured in the system data file (.SSA) that has been loaded are looked at. Only the 4T4, 4T1, and 2T1 messages are "fagged" as having been received. The 4T4 and 4T1 messages concern TADS/PNVS related messages and the 2T1 messages concern the switches.

Data Acquisition is initiated by first selecting what 1553 bus the operator will be collecting data from. The default is 1553B which is shown on the right most button. If the 1553A bus is desired, clicking on this button will change the button face to 1553A and set up the data acquisition hardware for the 1553A bus protocol. This is a "toggle" type of setting.

Next, depress the "Run BM" button which stands for "Run Bus Monitor Mode". This starts the Data Acquisition Process. Most systems will collect all possible messages which move across the 1553 bus within 50 milliseconds. The system is currently configured to continue data collection and message processing until either a fault is detected or the 'Stop BM' button is pressed. When a fault is detected, the system will stop the data collection and processing and display the failure information as if the "lightning bolt" speed button had been pressed.

If the operator has an active 1553 bus channel with TADS TEU, the TEU software version will be displayed in the Software Version: box on the 1553 Data Acquisition Screen. If that box remains blank, there is no data flowing from the TADS TEU on the 1553 bus channel selected. If there is 1553 data flowing on the connected bus channel, the 4T4, 4T1, and/or 2T1 check boxes will become checked as the appropriate bus messages are received and processed. if there is no Software Version and no 4T4, 4T1 or 2T1 indications, there is most likely no 1553 bus data flowing on the channel that the DA Tool is connected to. This means that the operator will have to switch to the other 1553 bus channel on the RHE. This is done by restoring the J2 connection on the RHE and using the J3 connection. After the operator has switched the system from the J2 connection to the J3 connection, he can press the Run BM button on the AADS Tool's screen to re-start the data collection.

The TEU software version should now be displayed in the Software Version: box. If it is still not displayed, the operator can try switching back to the J2 1553 bus channel to see if that corrects the problem. Also, the operator can check to make sure that the cabling is correct and is not kinked. If the problem still exists, there is most likely a 1553 bus problem or failure. This will require troubleshooting beyond the scope of the DA tool. Data acquisition can be stopped by depressing the "Stop BM" button. As described above, the data acquisition process only needs to be run for a few seconds, and 15 seconds should be more than sufficient.

If there are any faults detected during the 1553 data acquisition processing, the "Text Based Diagnostic Results" window will be displayed. This is the same window that is displayed if the "Lightning Bolt" speed button had been pressed.

The components that have failed will be listed in the hypothesis column. Press the "Next>>" button to display the "Graphic Based Diagnostic Execution Screen" which will provide additional information about the failure(s).

On the "Graphic Based Diagnostic Execution Screen", the failed components are listed in the text panel in the lower right portion of this window while the failed tests are highlighted with a cyan bar in the text panel in the upper left portion of this window.

To quit the "Text Based Diagnostic Results" window the operator can press the "Quit" button. This will return the DA tool to the "1553 Data Acquisition Screen". "Fresh" data collection runs can be re-run by pressing the "Run BM" button.

To quit the "1553 Data Acquisition Screen" the operator can press the "Quit" button.

Saving the 1553 test data can be performed by pressing the $10^{th}$ button on the DA Toolbar (which is labeled as 1553 DATA). This will bring up the "RAW 1553 Data Inspection" window. Press the Save button to save the collected 1553 data. The Save As dialog box that is displayed to save the file will prompt for a filename using a "standardized" file extension of MSG. This is to keep the DTA and 1553 data files separate. It is suggested that a meaningful filename be used. Something along the lines of using the last four digits of a helicopter's tail number with the month and date (in MMDD format) would work very well. To quit the "RAW 1553 Data Inspection" window, the operator can press the "Quit" button.

To re-load a saved 1553 test data file, the operator can press the $10^{th}$ button on the DA Toolbar (which is labeled as 1553 DATA). This will bring up the "RAW 1553 Data Inspection" window. Press the Load button. This will bring up a MS Windows™ standard file "Open" dialog box which will allow selection of the file to be retrieved/loaded. To quit the "RAW 1553 Data Inspection" window, the operator can press the "Quit" button.

The stored data files can be used as if the data had just been collected. To view the failed components (if any), press the "Lightning Bolt" button. This ability to save and reload collected data will allow data collection from several helicopters with the analysis of that data taking place at a later time or place.

Figure 7:
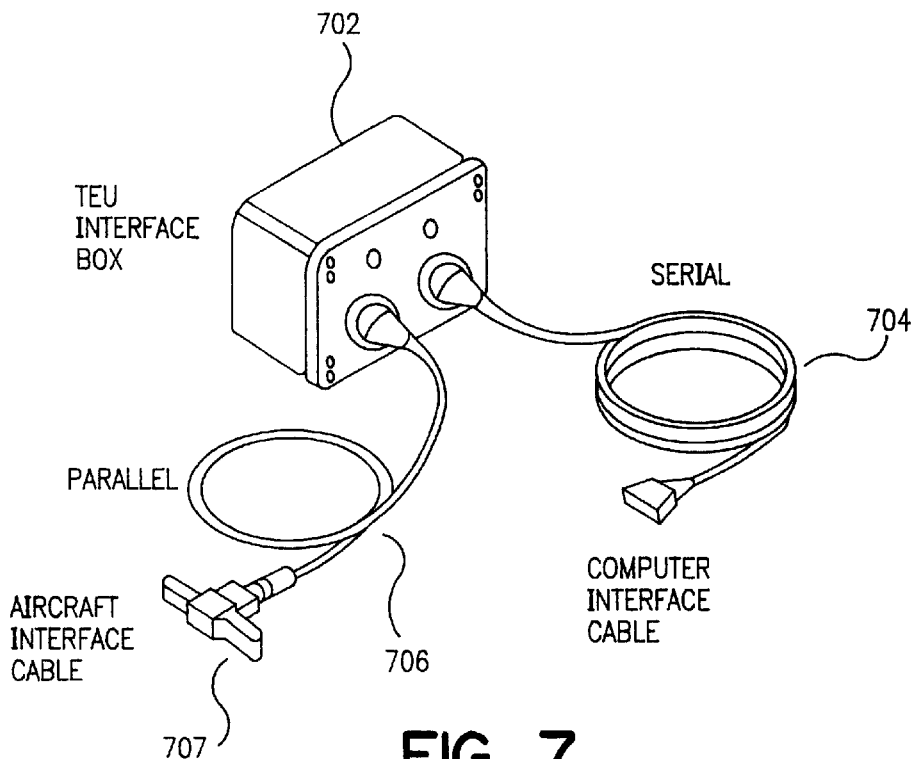
FIG. 7 shows an interface and connection cables that are compatible with an embodiment of the invention.
Figure 9:
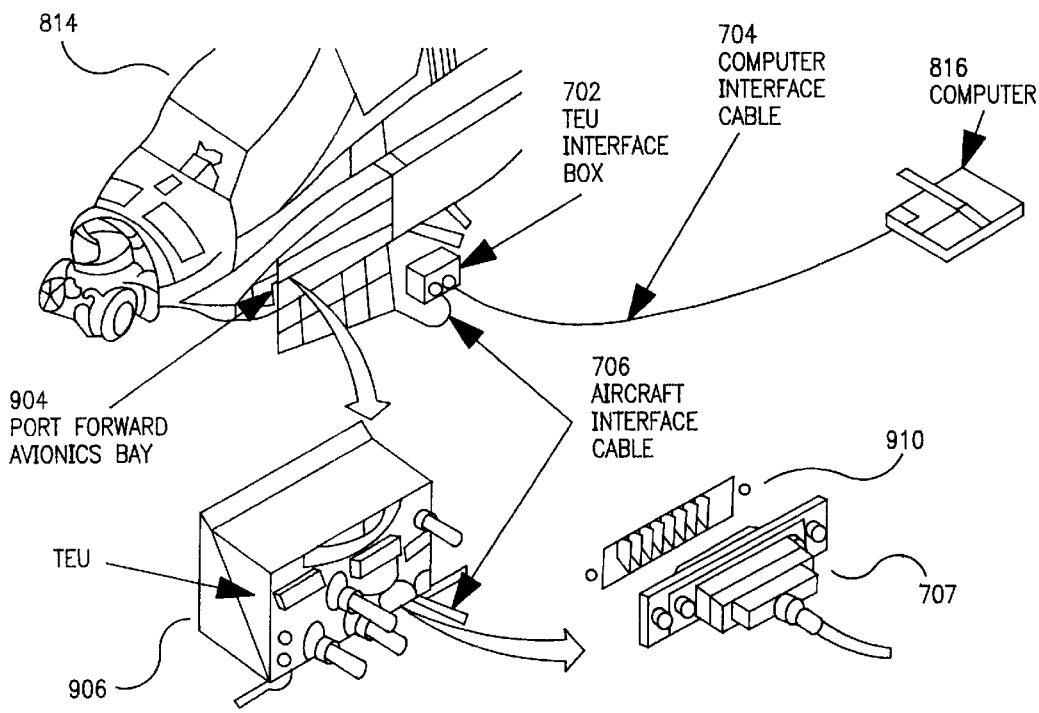
FIG. 9 shows a connection configuration in accordance with an embodiment of the invention.
Figure 10:
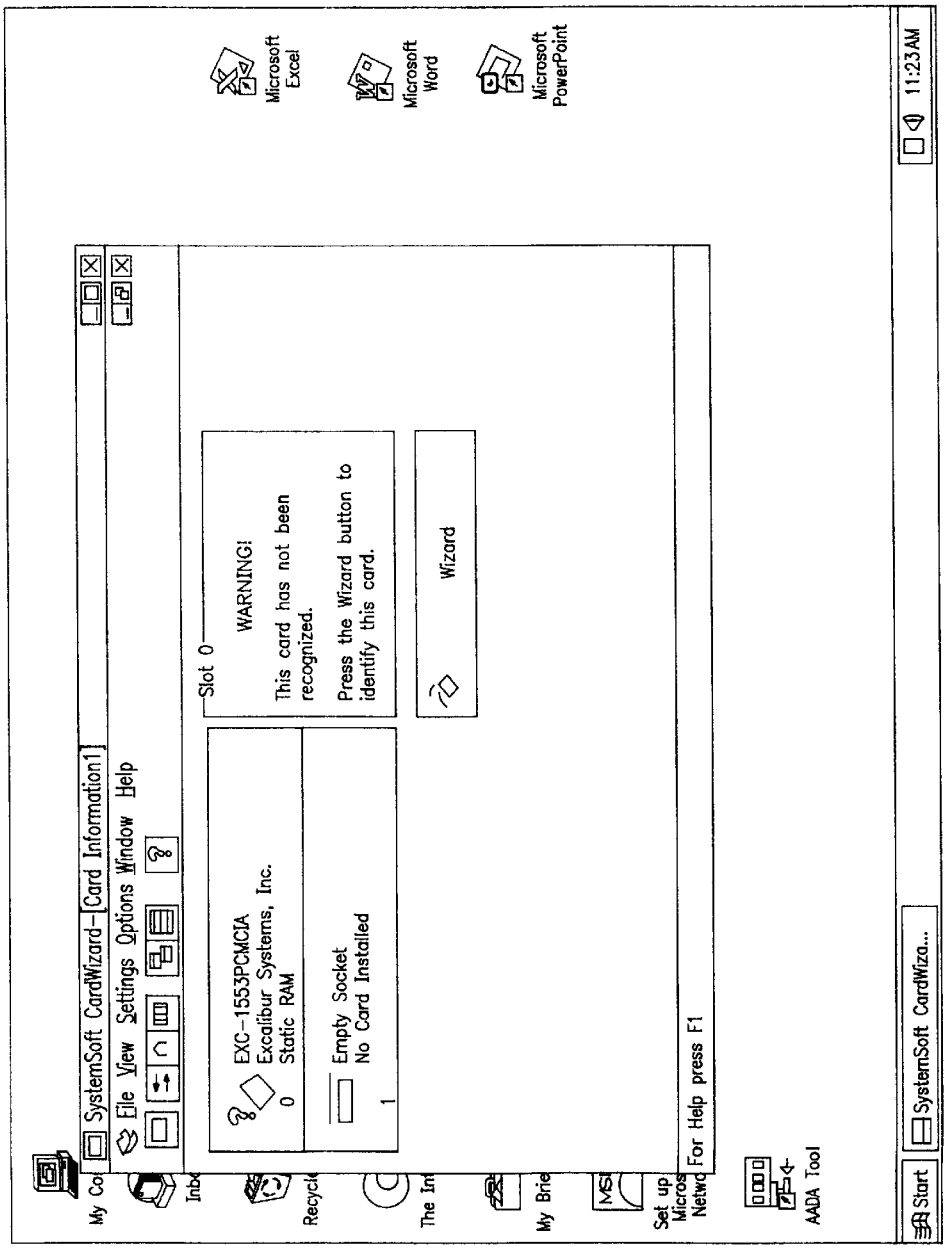

To use the DA tool for DTA testing of the TADS/PNVS system on the Apache AH64 model "A" helicopter, the DA tool can be attached to helicopter as shown in FIGS. 7 and 9. FIG. 7 shows a TEU interface box 702, having a computer serial interface cable 704 and an aircraft parallel interface cable 706. As shown in FIG. 9, the TEU interface box 702 is placed near the port forward avionics bay 904 of the helicopter 814, and the free end of the aircraft parallel interface cable 706 is connected to the TEU 906 via a connector 910 in the TEU and a cable plug 707 on the end of the cable 706. The free end of the computer serial interface cable 704 is connected to the laptop computer 816. These connections can be made after the AH-64 model "A" helicopter 814 has been properly powered up and both the TADS and the PNVS systems have been powered up.

The DA Tool software program on the laptop computer 816 can be configured to automatically load the APACHEA.SSA system diagnostic file from the C:\DA directory on the hard drive of the laptop computer 816 when the DA tool software is activated or launched. If a different system diagnostic data file was loaded after starting the program (e.g., BITCHECK.SSA), then the APACHEA.SSA system diagnostic data file would need to be loaded prior to conducting DTA testing. To load the APACHEA.SSA system diagnostic data file, press the left most button on the DA Toolbar. Select the file named APACHEA.SSA. The "A" model Apache. The diagnostic file is selected using a standard MS Windows™ file dialog box. After the diagnostic file selection is completed, the DA tool returns the display to the DA Toolbar screen.

Figure 13:
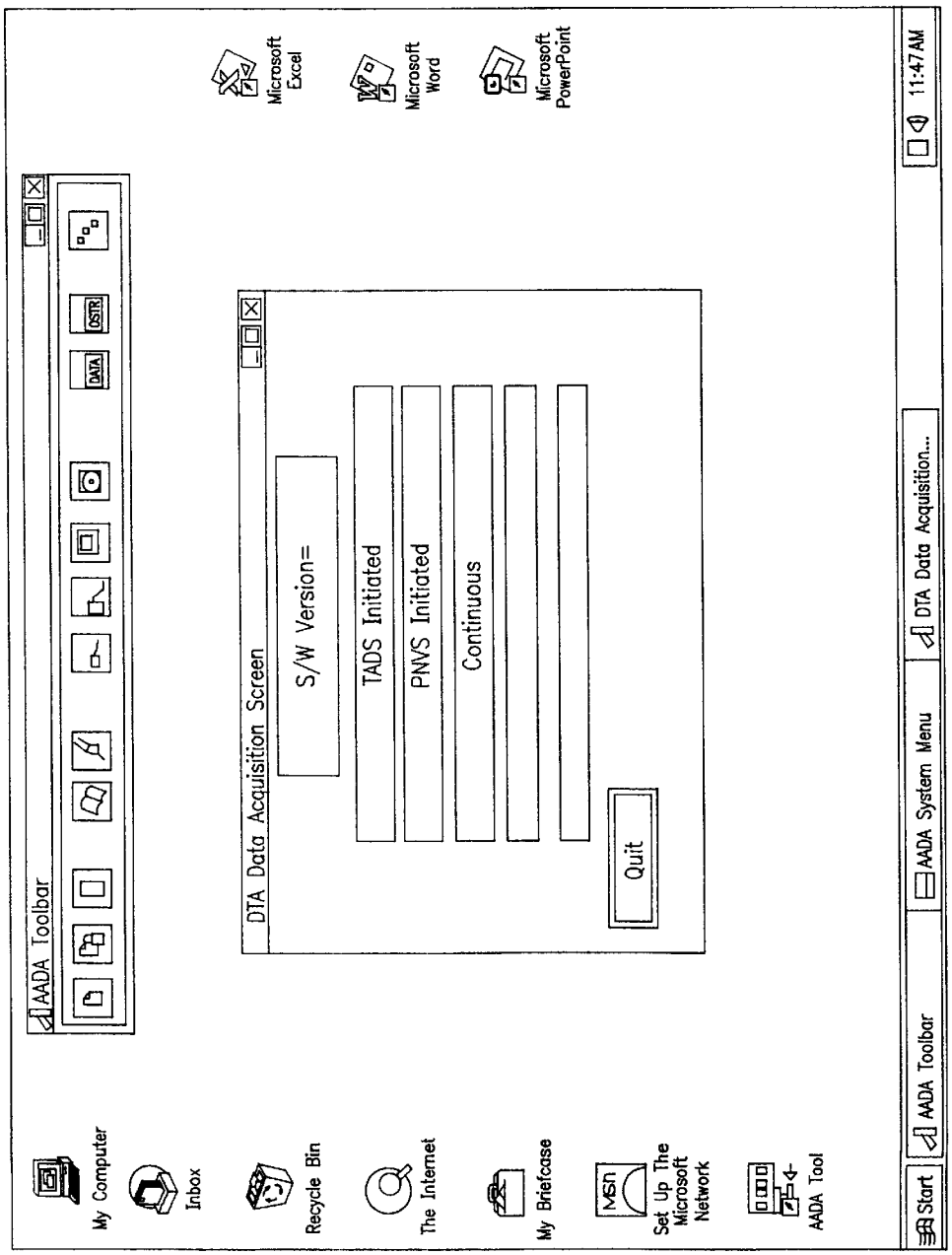

Next press the seventh button on the DA Toolbar (labeled RS232) to start the DTA data acquisition process. The DTA Data Acquisition Screen shown in FIG. 13 will be displayed.

There are three buttons displayed on this screen, TADS Initiated, PNVS Initiated, and Continuous. These corresponds to the TADS FD/LS, PNVS FD/LS, and TADS/PNVS Continuous FD/LS options on the DTA Select Mode menu.

To perform the initial switch setting procedures for TADS, the operator can refer to paragraph 3-1 of U.S. Army Technical Manual TM 9-1270-476-20-1 (which manual is hereby incorporated by reference in its entirety). To perform the initial switch setting procedures for PNVS, the operator can for refer to paragraph 3-9 of U.S. Army Technical Manual TM 11-5855-265-20-1 (which manual is hereby incorporated by reference in its entirety). The power-up procedures can be performed by referring to paragraph 3-2 of U.S. Army Technical Manual TM 9-1270-476-20-1, and paragraph 3-10 of U.S. Army Technical Manual TM 11-5855-265-20-1. Maintenance operational check switch setting procedures for TADS can be performed by referring to paragraph 3-4 step 1, of U.S. Army Technical Manual TM 9-1270-476-20-1. The Fault Detection/Localization System (FD/LS) functional check switch setting procedures for PNVS can be performed by referring to paragraph 2-10, step 1, of U.S. Army Technical Manual TM 11-5855-26-20-1.

On the "DTA Data Acquisition Screen" if the operator is running TADS Initiated and continuous FD/LS, press the TADS Initiated button. If the operator is running PNVS Initiated and Continuous FD/LS, press the PNVS Initiated button. To run TADS/PNVS Continuous FD/LS, press the Continuous button.

Assuming that communication with the TEU was established, once the DA laptop computer receives the TADS software version from the TEU, it will be displayed in the "S/W Version=" panel. The DA laptop computer 816 is now waiting for TADS Initiated FD/LS to be selected from the helicopter. This is indicated in the prompt display box by the message "Waiting for Bit to Start".

At this point, if the operator has a helper in the helicopter cockpit, he can tell the helper to run TADS Initiated Bit now. The operator can refer to paragraph 3-4 of the U.S. Army Technical Manual TM 9-1270-476-20-1 for help in performing the TADS INITIATED BIT procedures. The system will now run the FD/LS to completion without stopping at a failure.

When the automatic portion of the TADS class B FD/LS has completed, the HOD in the helicopter's CPG station will display "ARE OPERATOR INTERACTIVE TESTS REQUIRED? (Y/N)". The operator must answer no (N) to this prompt for the DA laptop computer to receive the FD/LS data. When the data is being received, the data box on the DTA Data Acquisition Screen will display the incoming data in hexadecimal format, and the prompt box will display "Starting TADS IBIT Data Collection".

When the DA laptop computer has received all of the TADS Initiated FD/LS data, it will automatically request and receive the continuous FD/LS data. This is indicated in the prompt box by the message "Starting Continuous". When the Continuous FD/LS has been completed, the prompt box will display the message "Continuous Finished".

For PNVS Initiated/Continuous FD/LS, assuming that communication with the TEU was established, once the DA laptop computer receives the TADS software version from the TEU, it will be displayed in the "S/W Version=" panel. The DA laptop computer is now waiting for PNVS Initiated FD/LS to be selected from the helicopter. This is indicated in the prompt box by the message "Waiting for Bit to be Initiated". The operator can refer to paragraph 2-10 of U.S. Army Technical Manual TM 11-5855-265-20-1 and perform the PNVS INITIATED BIT procedures. The system will now run the FD/LS to completion without stopping at a failure. The DA laptop computer will then process the display the message "Waiting for BIT to Finish" in the prompt box. It will next display the message "Starting PNVS Initiated". When the PNVS Initiated FD/LS has been completed, the prompt box will display "Starting Continuous BIT". When the Continuous FD/LS has been completed, the prompt box will display the message "Continuous Finished".

With respect to acquiring TADS or PNVS continuous data, when the DA laptop computer has received all of the TADS or PNVS Initiated FD/LS data, it will automatically request and receive the continuous FD/LS data. If the Continuous button was pressed on the DTA Data Acquisition Screen, the DA laptop will also request and receive the continuous FD/LS data. When the Continuous FD/LS processing has completed, the prompt box will display the message "Continuous Finished". To quit the "DTA Data Acquisition Screen" the operator can press the "Quit" button.

To identify any components that may have failed, the operator can press the "lightning bolt" button on the DA toolbar, which will cause the "Text Based Diagnostic Results" window to be displayed. The components or replaceable units that the DA tool has identified as likely causes for testing failures or helicopter malfunctions, will be listed in the "hypothesis" column. Pressing the Quit button will display the "Graphic Based Diagnostic Execution Screen".

On the "Graphic Based Diagnostic Execution Screen", the failed components are listed in the text box in the lower right portion of the window. The tests that failed are highlighted with a cyan bar in the text panel in the upper left portion of the window.

To quit the "Graphic Based Diagnostic Execution Screen" press the "Quit" button.

To save the DTA test data, press the $11^{th}$ button on the DA Toolbar (which is labeled as DTA DATA). This will bring up the "TAW DTA Evaluation" window. Press the Save DTA File button to save the collected DTA data. If the operator ran the TADS Initiated, PNVS Initiated, and Continuous tests, the resulting data file will contain all of the collected DTA data. To save just the TADS or PNVS or Continuous data, a DTA file can be saved after each test.

The Save As dialog box that is displayed to save the file will prompt for a filename using a "standardized" file extension of DTA. This is to keep the DTA and 1553 data files separate. It is suggested that a meaningful filename be used. Something along the lines of using the last four digits of a helicopter's tail number with the month and date (in MMDD format) would work very well. To quit the "RAW DTA Evaluation" window, press the "Quit" button.

To re-load a DTA test data file that was previously saved and stored, press the $11^{th}$ button on the DA Toolbar (which is labeled as DTA DATA). This will bring up the "RAW DTA Evaluation" window. Press the Load DTA File button. This will bring up a MS Windows™ standard file "Open" dialog box which will allow selection of the file to be retrieved/loaded. To quit the "RAW DTA Evaluation" window, press the "Quit" button.

The stored data files can be used as if the data had just been collected. To view the failed components (if any), press the "Lightning Bolt" button. This ability to save and reload collected data will allow data collection from several helicopters with the analysis of that data taking place at a later time or place.

Should a given test produce a fault callout that is incorrect, such as calling out the TADS Power Supply (TPS) when the "real" failed component is the Television Sensor Assembly (TVS), the DA Tool has to ability to be made to "learn" what the "more correct" fault callout is. To cause the DA Tool to "learn" a new/preferred fault callout for a given test, when that test has been failed by the "wrong" component, bring up the DA System Menu by clicking on it's icon. Select the Diagnostics menu option. This will cause a pull-down menu to be displayed. Select the Graphical Shell option from the pull-down menu. This will cause a pop-up menu to be displayed. Select the Learn option and the "Text Based Diagnostic Adaption Screen" will be displayed. The "incorrect" failed component will be displayed in the "Selected Hypothesis" box. Find the "preferred" failed component by scrolling through the components in the "Hypothesis Selection List" using the scroll bar. Click on the "preferred" component to select it which will cause a cyan highlight bar to be displayed over that item. The selected component will be displayed in the "Correct Hypothesis" box. Then to make the "learn" process happen, press the "Adapt" button. To exit from the "Text Based Diagnostic Adaption Screen" press the "Quit" button. If the operator did not press the "Adapt" button, the "learn" process will not take place. The new failed component will now be added to the list of those components that are called out for that given fault condition. The next time this same test is failed, if the new/preferred component is not listed as the top (or most likely) failed component, repeating the "learn" process will cause it to move up on the list of "possible" failed components. Eventually, the "preferred" component will become the "top hitter" while the other component will drop off of the list. Then any further learn "processing will no longer be required for that given test condition. After making any "learning" changes, the APACHEA.SSA file will have to be saved to overwrite the existing version of that file so that the DA tool can "remember" the learning changes.

The operator can create new diagnostic files and modify existing diagnostic files by creating or editing tests and their relationships with replaceable units known to be included in the system that is to be tested, for example the Apache AH64 model "A" helicopter.

Figure 14:
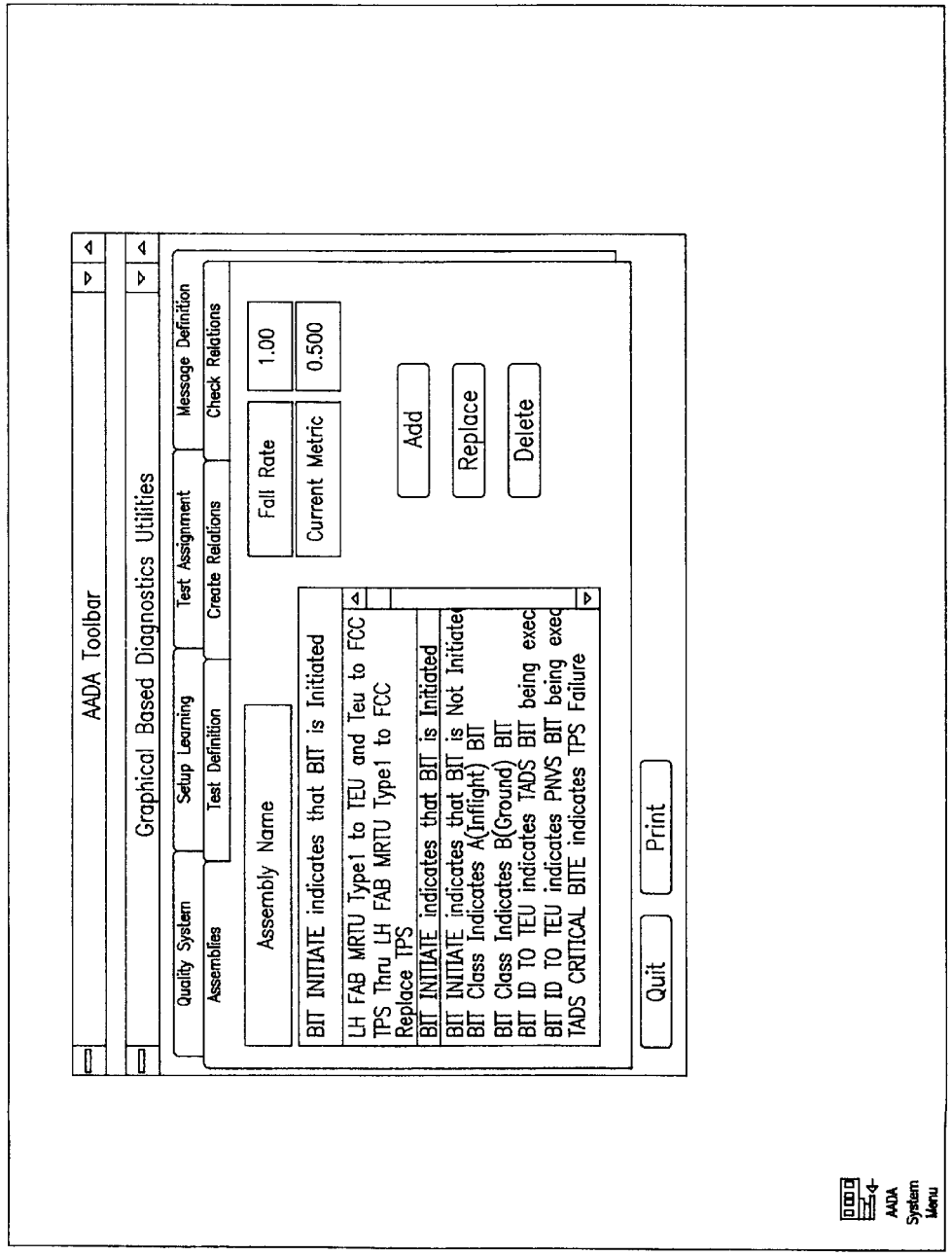

To do this, the operator first activates the left most button on the DA tool toolbar to open a diagnostic file, and then selects EMPTY.SSA which is an empty system diagnostic file that contains the correct header information. When selection of the EMPTY.SSA diagnostic file from a standard windows file dialog box is complete, the DA tool returns the tool bar to the screen. When the data editing capabilities of the DA tool are activated by clicking the fourth button from the left on the DA Toolbar, a tabbed notebook will appear on the screen with the following tabs:

(1) Assemblies
(2) Test Definition
(3) Create Relations
(4) Check Relations
(5) Qualify System
(6) Set Up Learning
(7) Test Assignment
(8) Message Definition First, proceed to assemblies by clicking on the "Assemblies" tab. The tab will move forward showing a list of assemblies and three boxes marked "Assembly Name", "Failure Rate", and "Current Metric", as generally shown in FIG. 14. Click on an SRU, for example the "P1A1A35 EI Mirror" Assembly which is the Elevation Mirror Assembly in the Lockheed Martin PNVS. Immediately, the Assembly Name box is filled with this name and the assemblies failure rate (in failures per million hours) is shown in the Failure Rate Box. An initial Failure Rate entry of 1.00 should be entered initially for any new Assembly entered. The current metric is set at 0.500 initially and will be described later but presently indicates that there is no reason to consider this assembly a cause of failure or to exclude it as a cause of failure. This is reasonable since we haven't run any tests yet. This tab is where new replaceable assemblies are added to the system. The failure rates are only used as a first cut in the automatic development of numeric relationships between tests and replaceable assemblies. After this first cut, they become a documentation feature since the auto adaption feature will override selections that are based purely on failure rate.

Figure 15:
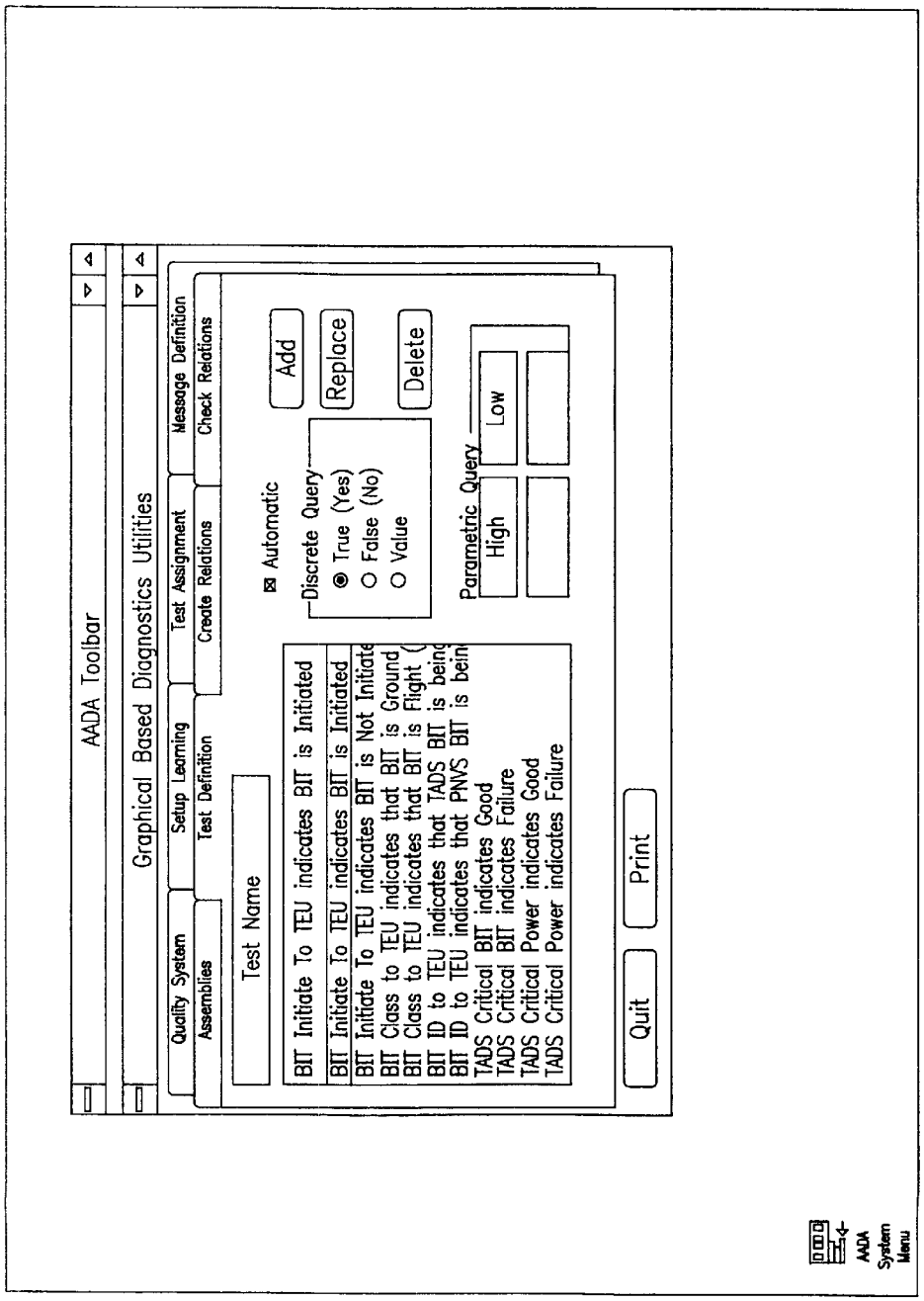

The next tab which would typically be used is the "Test Definition" tab which we will now click. This results in that tab being brought forward and displaying a list of tests, a box labeled "Test Name", a check box labeled "automatic", a group of radio buttons labeled "Discrete Query" with imbedded radio buttons labeled "True (Yes)", "False (No)", and a group of boxes labeled "Parametric Query" and with boxes labeled "High" and "Low". These features are generally shown in FIG. 15.

We click on a test called "TADS Servo Power" and this name immediately is displayed in the "Test Name" box, the checkbox marked "Automatic" is checked, and the radio button labeled "True (Yes)" is selected. The "Automatic" Checkbox is used to indicate whether the test represents an automatic test which requires no user intervention, or an interactive test which requires the user to perform some action, for example to operate a piece of equipment on the helicopter in a certain way. The "Discrete Query" radio button indicates what represents failure of this test: True (Yes), False (No). For example, when the True (Yes) radio button is selected, the test is considered failed in the result of the test is True, and is considered passed if the result is False. When the Value radio button is selected, this indicates that the results of the test are parametric and pertain to a range of values. For example, a voltage measurement might be tested parametrically. In an interactive parametric test, the user would be required to measure a particular parameter and enter it into an "input box". The DA tool would then determine if the provided value was within the range specified by the Parametric Query "High" and "Low" values. In the TADS/PNVS system, the "False (No)" value can be selected for some automatic tests, including for example the tests which check the BIT circuitry itself. In such situations, a lack of a failed condition can indicate failure.

Figure 16:
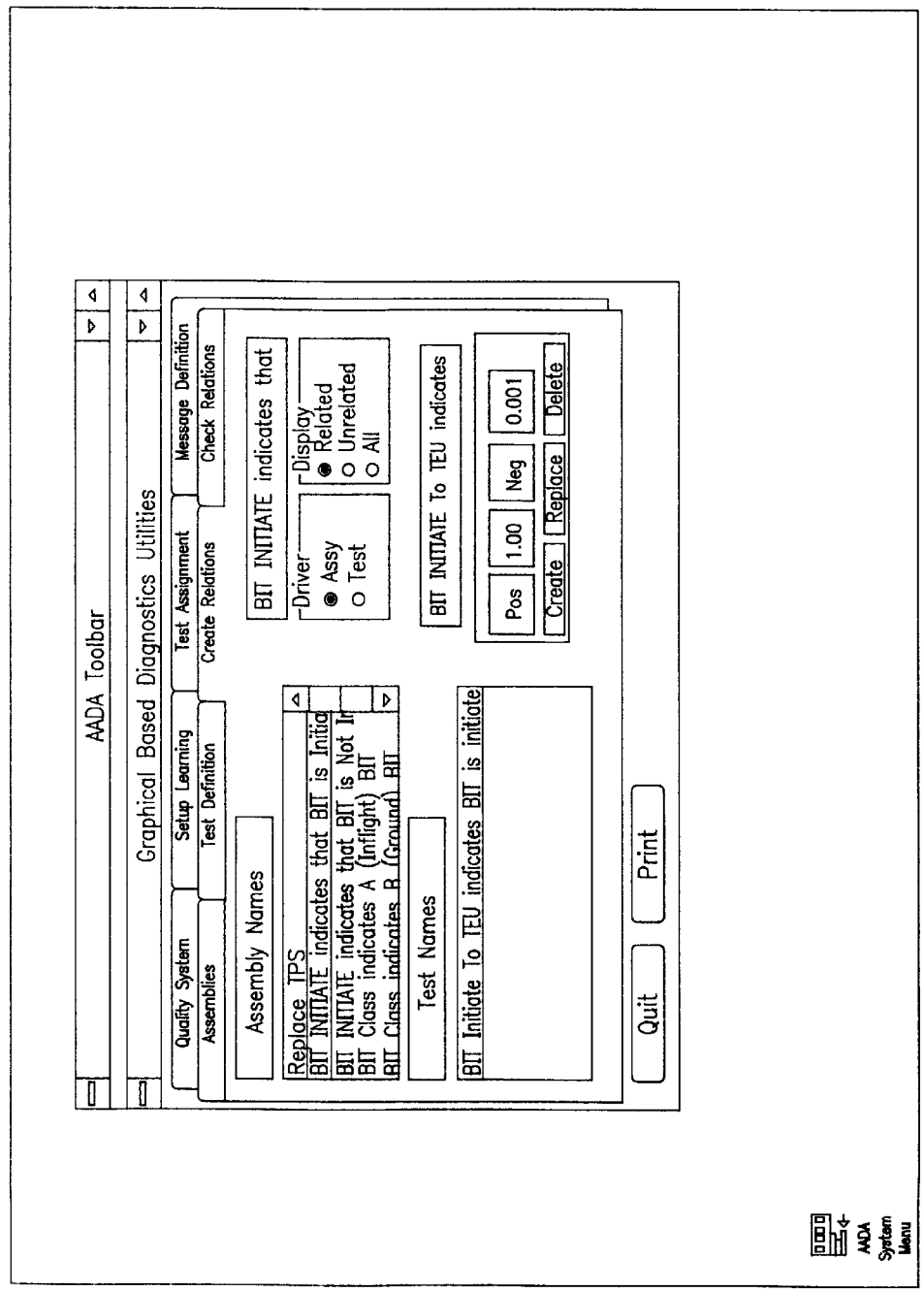

The next step would be to click on the "Create Relations" tab. This tab moves forward and lists previously input assemblies and tests and a radio group labeled "Driver" and one named "Display", as generally shown in FIG. 16. These two groups are related and work in the following manner.

When we enter this screen, "Assy" is selected in the "Driver" radio group. "All" is selected in the "Display"

radio group. We will change the Display radio group by selecting the "Related" radio button. We then select "P1A1A35 EI Mirror Assembly" from the Assembly Names list and it immediately shows up in the Assembly Edit Box. This action also changes the Test Name List which now displays only those tests with specific numeric relationships (ie Related to) to the Elevation Mirror Assembly. Clicking on any of these tests would fill the Pos (Positive likelihood) and Neg (Negative Likelihood) boxes with the numeric relationships of that test to that replaceable assembly. For a new relationship, a Pos value of 1.00 and a Neg value of 0.001 should be used. Clicking the "Unrelated" radio button displays only those tests for which no relationship exists and the "All" radio button displays every test. When trying to create any relational system, the operator will find that it is this type of a development screen which makes it possible. Auto-Adaption will modify all the relationships created here except for those few definitive (unambiguous) relationships. The relationships entered here provide a starting point for the DA tool diagnostic system.

Figure 17:
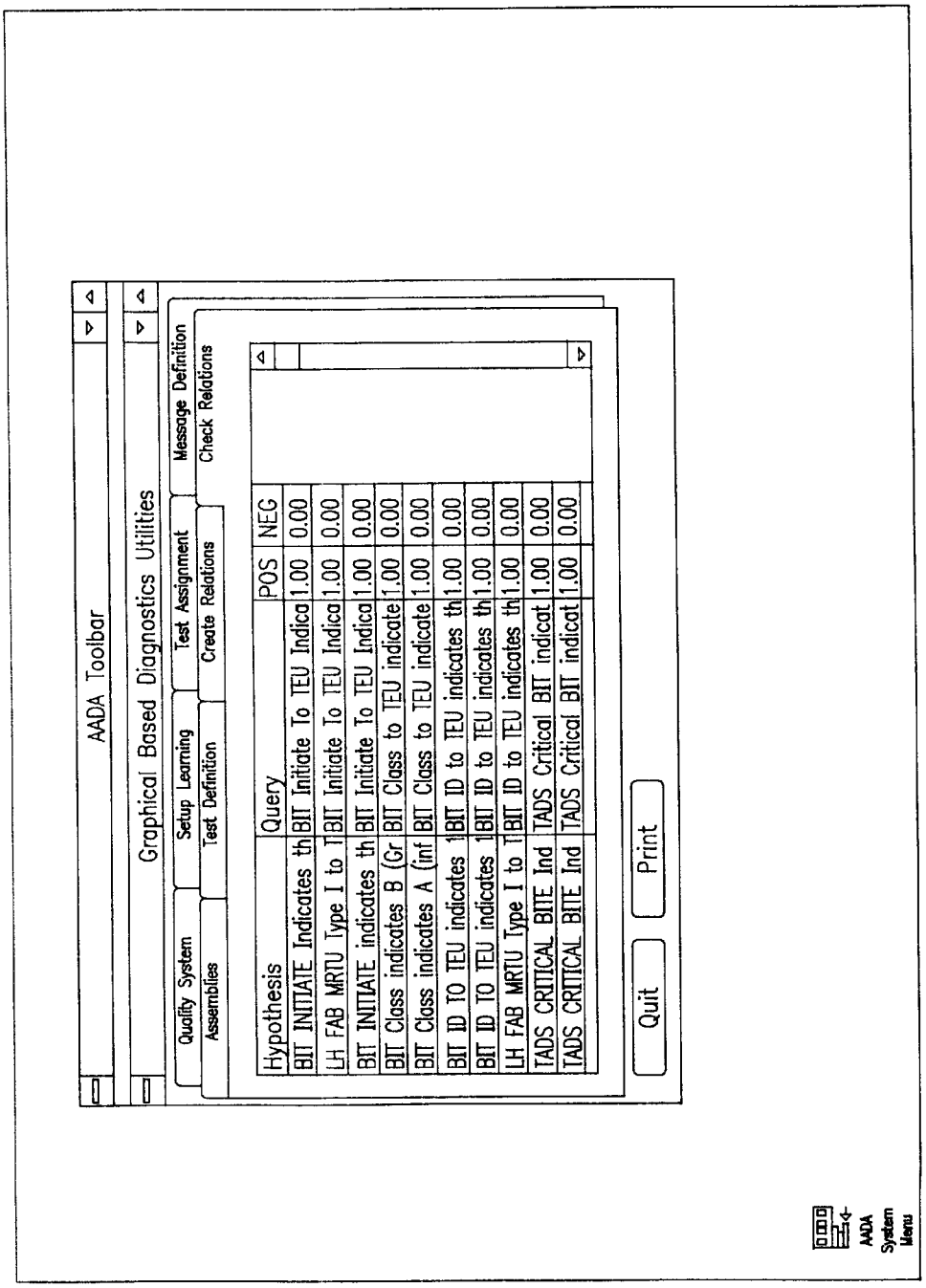
Figure 18:
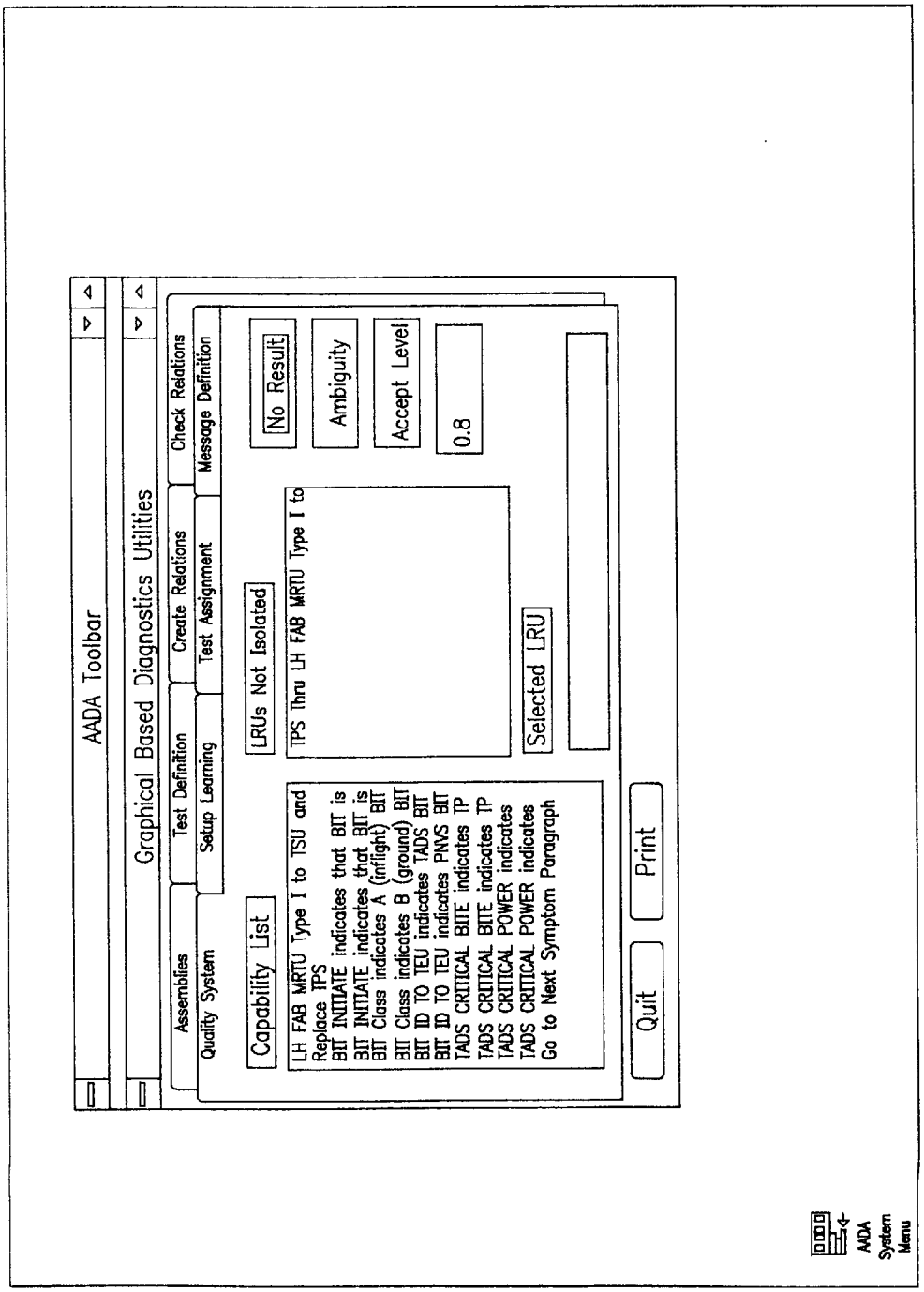

The "Check Relations" tab provides a scrollable table of all existing relationships as generally shown in FIG. 17.

The "Qualify System" tab, however, is extremely important and is clicked next. This screen shows up with two blank lists, a "No Result" button and an "Ambiguity" button, an "Accept Level" input box, and a "Selected LRU" box. This screen is generally shown in FIG. 17 and is used in the following manner.

An acceptable level of likelihood can be entered in the "Accept Level" input box. Under normal flight operations of the Apache helicopter, a value of 0.8, or 80% has been found to produce good results. Next, click the "No Result" button. The "Capability List" will fill with all assemblies which have sufficient testing to be included as a possible fault candidate for an 80% likelihood accept level. In this example, there are no LRUs which can not meet this accept level. However, we will now click on the EI Mirror Assembly and its name will show up in the "Selected LRU" box. We then click on the "Ambiguity" button. A relatively large number of LRU's and SRU's will show up in the right most list, which is now titled "Ambiguity". For example, 3 LRU's and 13 SRU's can show up in the right most list. The message indicates that at this low level of acceptance we will declare many LRUs and SRUs as possible failure candidates.

We can make the acceptance level very high, for example 0.99 or 99%, and re-perform the previous steps. At this level of acceptance 6 LRUs, and 14 SRUs cannot be isolated, but the ambiguity group for an Elevation Mirror Assembly is reduced to 2 LRUs and 2 SRUs. Isolation in this context means that if several LRU's are identified as probable causes of helicopter malfunction, but cannot be isolated, then we know that the problem is likely due to one of the identified LRU's but the DA tool cannot tell us which one, specifically. The Elevation Mirror Assembly is a purposely selected bad example and the result of altering the acceptance level are usually not so dramatic. The relationship of acceptance level to ambiguity, however, is an important consideration when selecting the operator acceptance criteria.

Allowing the operator to select or alter acceptance level allows the DA tool to be used flexibly in different situations. For example, very low levels of acceptance can be entered for FEBA systems ("Front Edge of the Battle Area") which have long spares acquisition times or are suffering from battle damage. In these cases, the maintainer needs to request all possible failure candidates due to the possibility of multiple faults (battle damage) or to eliminate addition trips from supply (quicker return to readiness). In general, this embodiment of the DA tool exemplifies the philosophy that data should be hidden to avoid overloading the operator, but should also be made easily available should the operator require more detailed information.

This ability to "Qualify" the system without testing allows the diagnostic system to grow along with the mission design or (for the commercially aware) allows the diagnostic system to be built as it is being designed.

Figure 19:
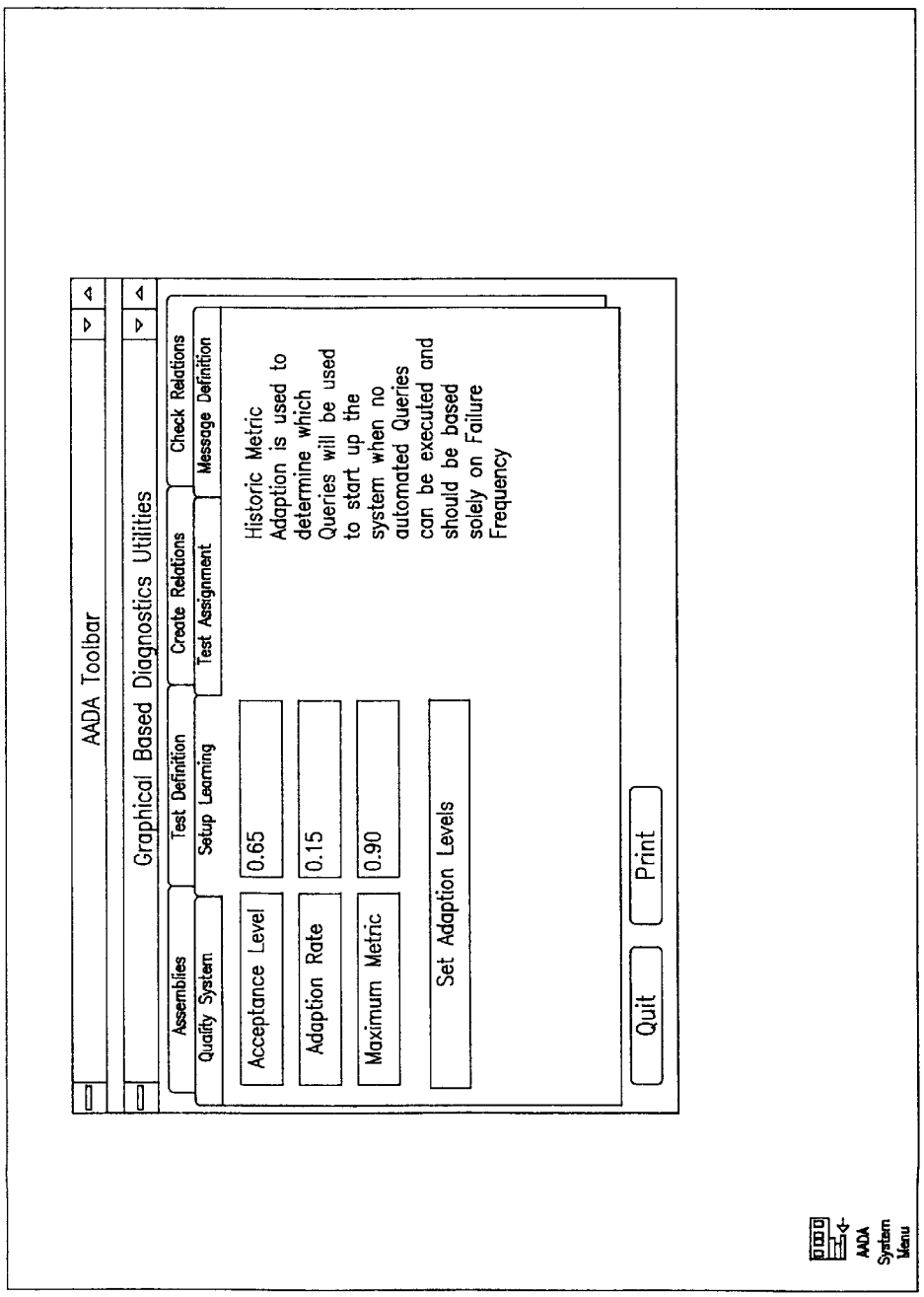

The "Set Up Learning" tab results in the screen generally shown in FIG. 19, and allows for three system parameters to be set: Historic Adaption, Case Based Adaption, and Maximum Metric. Historic Adaption allows a separate failure-rate-based adaption of the diagnostic data. When Case Based Adaption is used, however, Historic Adaption confers little if any additional benefit and can be omitted.

Case Based Adaption is the rate at which the system reacts to the "actual cause of failure" when anomalous fault selections are corrected. In other words, it is the speed at which system mis-diagnosis are corrected. One would be tempted to set this rate at the highest level possible, but in field operation it has been found that a low speed of adaption (0.15 or less) is best. High speed of adaption leads to system oscillations where the most probable cause of failure is always the last item that failed. Low levels of adaption ensure that the system reflects true fault experiences and doesn't oscillate between two very closely related assemblies or completely eliminate infrequently occurring faults. Fielding and experience are the best methods of selecting the correct value for this metric. The Case Based Adaption is, in effect, an increment by which the probabilities that a particular part of the helicopter (e.g., system, subsystem, component, SRU, LRU, etc., each of which can be generally referred to as an assembly) is responsible for a given malfunction, are altered at each learning event.

The Maximum Metric is necessary to ensure that systems involved in a large number of tests are not constantly selected due to a "preponderance of the evidence". Such a situation would usually result from Auto Adaption where a highly tested assembly is selected as the correct cause of failure. The Maximum Metric simply restricts the contribution that any one test can make to a determination that a particular assembly is the cause of failure. The Maximum Metric can be physically over-ridden in the Creation Relations screen, and is meant to restrict auto-adaption from creating definitive relationships (i.e., unambiguous) on it's own (which would be a mistake). In general, any system using numerical relationships should include some mechanism to ensure that definitive relationships can only be created directly by the user and never by the diagnostic systems adaption process. Remember that it is a requirement that once a definitive relationship has been created, it can never be changed by the adaption process.

Figure 20:
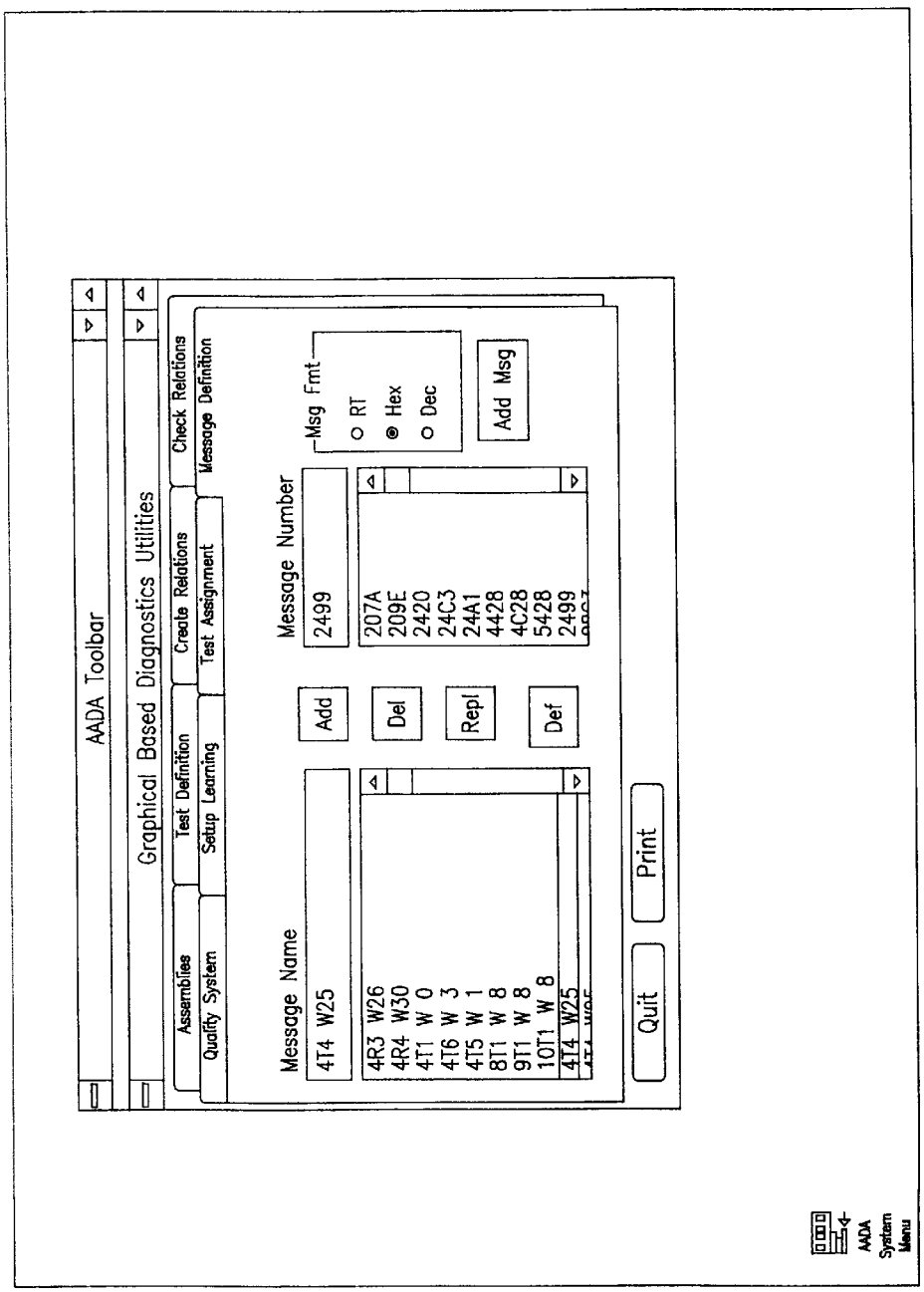

The final two tabs: "Test Assignment" and "Message Definition" deal directly with the 1553 Data Acquisition System. The "Message Definition" screen, which is generally shown in FIG. 20, allows the operator to associate names with individual 1553 messages. These names are required to associate Test Names with the bit patterns embedded in 1553 messages. Pressing the Def (Default) button at the center bottom of the screen, results in all 1553 messages being automatically generated as names in RT format (a format commonly used with the 1553 bus). For example, "4T4 W30" would be RT 4 Sub-Address 4, with 30 data words. The command words of the messages collected can be displayed in either Hex, Decimal, or RT format through the selection of a radio button with that word on it.

The main purpose of this screen is to allow the creation of a diagnostic system, in the shortest time possible, starting with the collection of all messages on the 1553 bus.

Clicking on the default button "Def" creates names which indicate all the RT's and RT Sub-Addresses available along with the number of data words included. Tests can then be associated with individual bit patterns within these messages using the "Test Assignment" Function. This is the next and last tab.

If a given message is needed but is not available even after pressing the "Def" button, then a new message must be added to the System Diagnostic Data file (.SSA file) being used. This is a multiple step process. First, determine the RT identifier (i.e., 4T2, 5R2, etc.) for the new message from a Mux Data Base Description printout. Then refer to the Command Word & Message Descriptions printout which is part of the Mux Data Base Description printout set. Locate the desired RT identifier under the Message Name New/Old columns. The number displayed in the WRD CNT column for that RT identifier is the number used after the "W" in the RT format message name (i.e., 4T4 W25, 4T1 W0). In the case of the 4T1 W0 message, the WRD CNT is actually displayed as 32. But on the actual 1553 data bus, a zero (0) is used.

In all other instances, the actual number in the WRD CNT column is used. The HEX VALUE column gives the Hex value for the RT format message and should be written down with the rest of the message identifier information (i.e., 5R2 W14=284E). The Hex value will be used to verify that the RT format for the message has been properly entered.

Now we're ready to actually update the DA tool with the information for the new message. There are two text boxes on the Message Definition tab, the one on the right is labeled Message Number and the one on the left is labeled Message Name. In the Msg Fmt group box, click the radio button in front of the "RT" to indicate that RT format message identification will be used in the Message Number windows. Now select one of the RT format message identifiers that is similar to the one that is to be added (i.e., 8R3 W28 could be used for 5R2 W14). This will cause it to be displayed in the edit box below the words Message Number. Edit this entry as needed to make it read correctly for the new message being added. When this has been completed, press the "Add Msg" button. This will cause the new message's RT format identifier to be added to the end of the list in the Message Number list box's column. Use the slider bar to go down to the bottom of the list in the Message Number list box. Select a message identifier above the newly added one, then select the newly added message identifier. This insures that the entry that the program made at the end of the list is really the one that is selected. Now select a message identifier in the Message Name list box which will cause it to be displayed in the edit box below the words Message Name. Edit this entry as needed to make it read correctly for the new message being added. When this has been completed, press the "Add" button. This will cause the new message's RT format identifier to be added to the end of the list in the Message Name list box. Select a different message identifier in the Message Name list box and then select the newly entered message identifier. This will insure that the entry that the program made at the end of the list is really the one that has been just selected. Now select the Hex option in the Msg Fmt group box. Reselect the newly entered message identifier in the Message Name list box. This should cause the hex number that was written down previously to be displayed in the Message Number edit box. If this is the case, the message has been successfully added to the System Diagnostic Data file's information stored in RAM memory. To make the addition more permanent, press the "Quit" button to exit back to the DA Toolbar then press the second button from the left on the DA Toolbar which is labeled "Save System Data File" in the status bar. Then select the file that the new message's information is to be saved into the normal "file save" manner.

Figure 21:
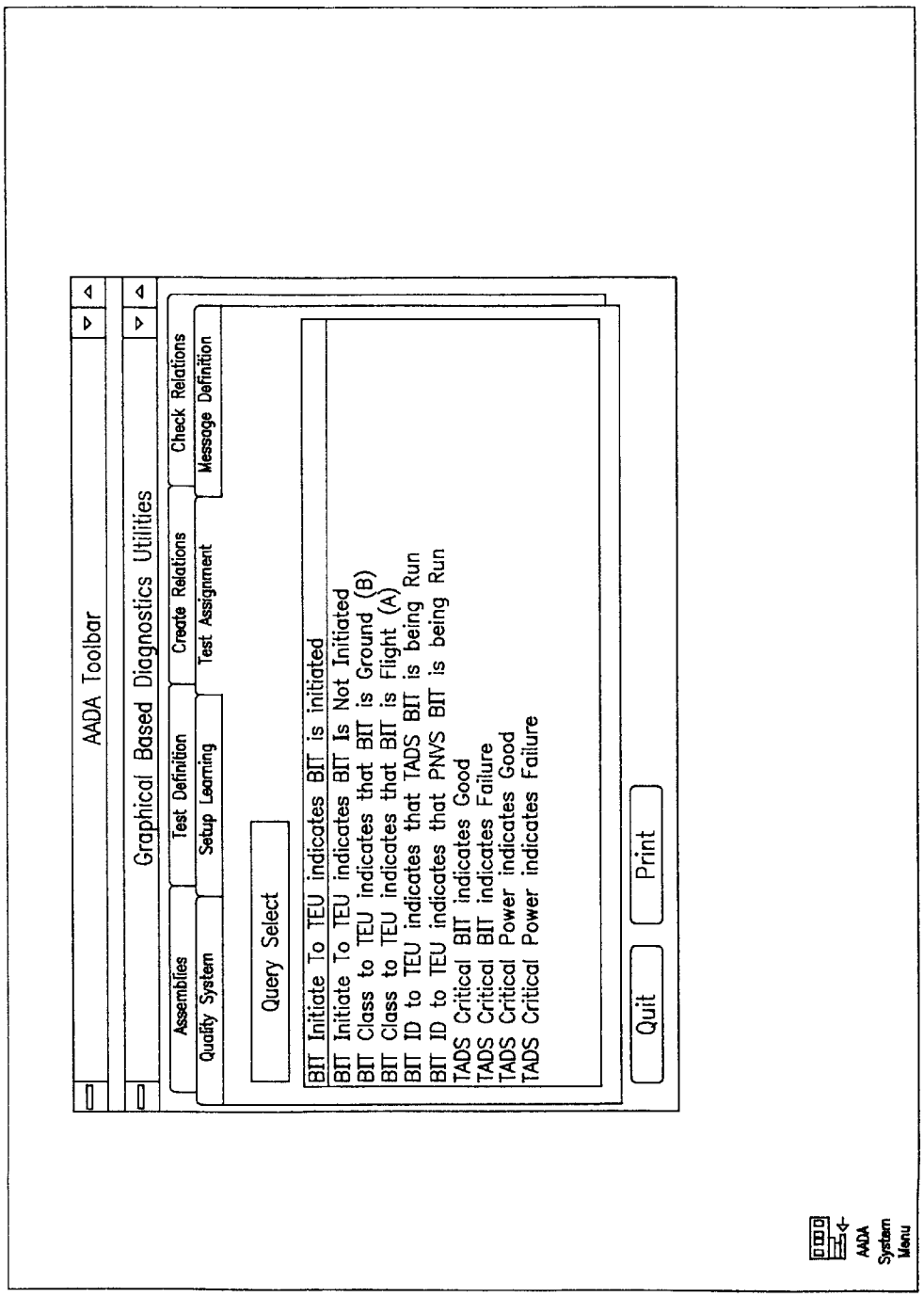

The "Test Assignment" tab brings up a screen with a list of tests, which is generally shown in FIG. 21. We will scroll down through the tests unit we find a 1553 test called "4T4 TADS Computer Status". Many of the exemplary tests shown in FIG. 21 are collected from a proprietary RS232 bus, and the 4T4 is used to start off any test which was based on 1553 message data. Clicking on this test brings up the "Test Definition Screen".

Figure 22:
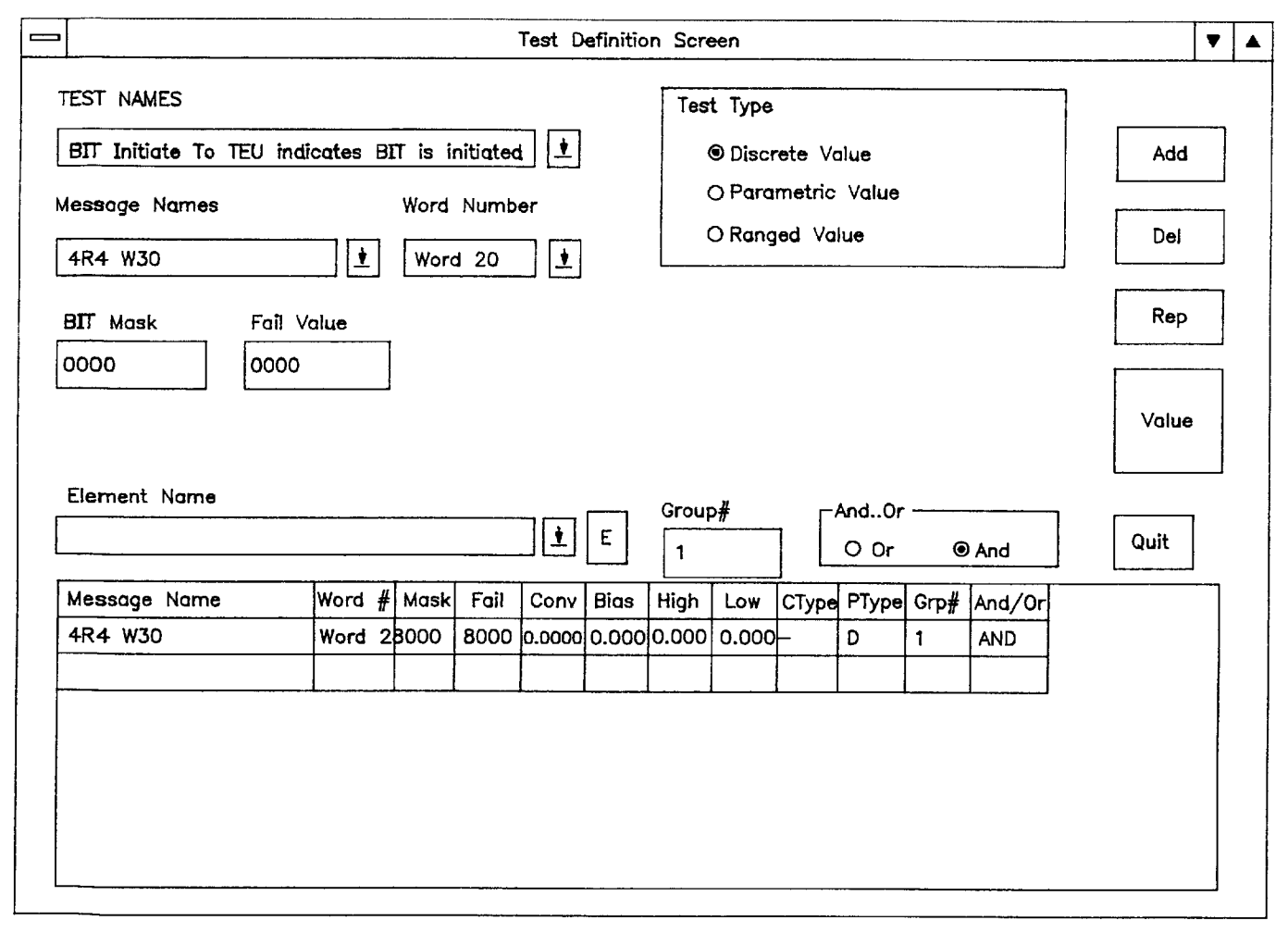

The Test Definition Screen, which is generally shown in FIG. 22, is quite full and complex, but the operation is not. The operator selects the test the operator wishes to define from the Test Name Combo Box. Next, the operator selects the 1553 message and its embedded data word which the operator wishes to associate with that test. At this point the operator has established the test the operator wishes to attach to a 1553 message, the message the operator wishes to associate it to, and the word within that message which includes the bits which will be used to determine if the test is failed or not.

The DA tool system can evaluate both discrete and parametric testing. Selection of the type of test to be defined is accomplished by clicking on the associated "Test Type" in the group box with that name. The choices are "Discrete", "Parametric", and "Ranged". "Discrete" is the default when the system comes up.

Figure 23:
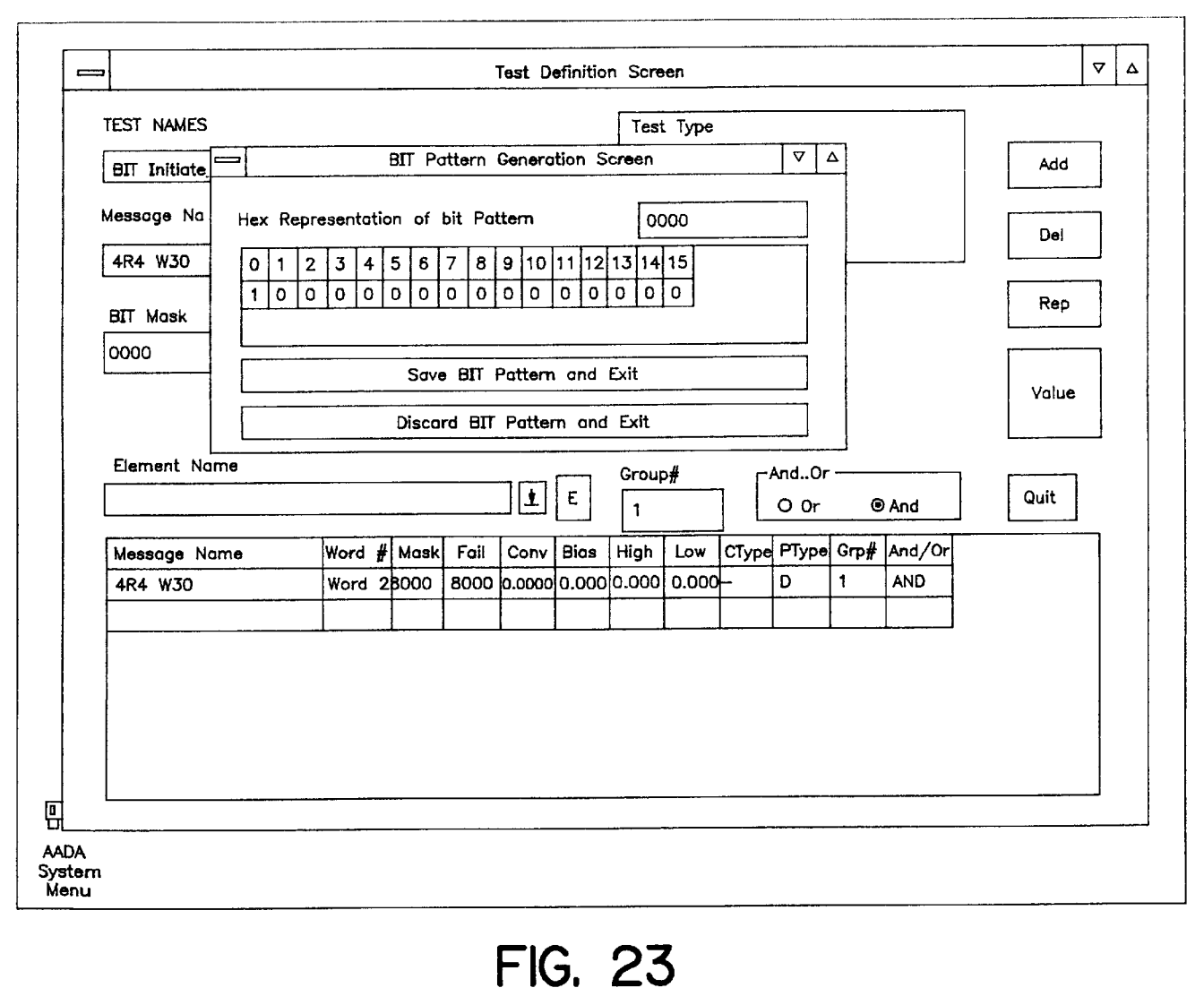

Clicking on the words "BIT Mask" on the screen will bring up a 16 bit grid, as generally shown in FIG. 23. Putting a "1" in any of the 16 locations will result in that bit being included for failure evaluation. If the operator wishes to evaluate the complete word, the operator can put "1"s in all 16 locations. If the operator only wants to evaluate bit 7, the operator can put a "1" in bit 7. The hex representation of the entered bit pattern is shown up in the right hand upper corner and it is this that is saved and displayed when the operator is satisfied with the bit pattern masking selection. Next, click on the words "Fail Value" on the screen and enter what value (in the Bits selected to be masked off) represents failure for this test.

For example, if the operator enters a "1" on bit 7 in the Bit Mask and a "0" in bit 7 as the Fail Value, the test will be considered failed when bit 7 of the message and word selected is a "0". If a "1" was entered into bits 7, 8, and 9 in the bit mask and a "0" was entered into bits 7 and 8 and a "1" in bit 9 of the Fail Value, then the test will be considered failed if the selected message and word has a "0" in bit 7, a "0" in bit 8, and a "1" in bit 9. In summary, Discrete tests check for specific values in specific bit locations of the selected message and word.

Clicking on the Parametric radio button or the Ranged radio button shown in FIG. 22 results in reconfiguration of the screen. The Parametric button represents a Parametric Value test type, which is used to test if a value is outside of specified limits. In contrast, the Ranged Value test type represented by the Ranged radio button is used to test if a value is inside (or within) the specified limits. The "Fail Value" box disappears and is replaced with 4 new boxes labeled "Conversion Factor", "High Value", "Low Value", and "Bias". A new group box is also added at the bottom right labeled "Real Scale Representation" and contains a single radio button "Signed Binary" which is selected.

The first step is to mask off those bits which will make up the parametric value to be tested. This is entered into the Bit Mask as indicated earlier but can also be directly entered as "FFFF" (Hexadecimal representation) if the complete word is to be used (which is typically the case). Then the operator can click on the words "Conversion Factor" which will open up the "Dynamic Conversion Setup Screen". On this screen the operator selects the type of conversion the operator wishes to make from one of four predefined types: signed binary, unsigned binary, signed BCD, and signed BCD.

For example, suppose the operator had told the system that the complete 16 bit word is to be used (by entering "FFFF" into the Bit Mask box) to represent +100 to −100 pounds per square inch (PSI) in signed binary format. The operator would select the radio button labeled "Signed Binary" and enter 100 into the box labeled "Top of range" and −100 into the box labeled "Bottom of Range". If the operator wants to look at the conversion and bias factors prior to saving the results, the operator can click on the "Convert and Display" button. Since it is a signed binary value, the bias value is 0.0. The conversion factor is displayed as 0.003052 which translates to 0.003052 PSI per bit. If the operator is satisfied with the results then the operator can press the "Save Conversion Factors and Quit" button and the operator will see the Conversion Factor and Bias boxes filled with the correct values for the range the operator provided. If the operator made a mistake there is also an "abandon ship and get out of Dodge" button which is labeled "Quit without saving Conversion Factors". In the MUX Data Base Description printout, the Conversion values are the number set shown outside of the parentheses.

The High and Low values can now be entered in "Real World" format (i.e., in PSI). If parametric is selected as the type, the test will be considered failed if the actual value is less than the provided "Low Value" or above the provided "High Value". If Ranged is selected as the type, the test will be considered failed if the value being tested is between the "Low Value" and "High Value" provided. In the MUX Data Base Description printout, the High and Low values are the number set shown inside of the parentheses.

For example, if the operator enters the conversion factors for +100 and −100 PSI as described above and enters 50 as the "High Value" and 0 as the "Low Value", then the parametric type would fail if the value acquired over the 1553 bus were greater than 50 PSI or less than 0 PSI. The ranged type would fail if the acquired value were between 0 and 50 PSI.

If test data has already been acquired (ie. 1553 messages have already been collected off the bus), clicking the "Value" button will automatic collect the correct 1553 data, convert it, and display the converted value. In this manner questions about the actual format of parametric data can be determined on-line.

The remaining controls are used to combine multiple bit patterns and parametric values into a single test. All defined 1553 message associations for a particular test are listed in a grid format at the bottom of the screen. Clicking on any association results in the screen being formatted to the test type (discrete, parametric, or ranged) and all boxes being loaded with the previously entered data.

Click on the "Add" button to "add" this test to the system. If there are no additional tests to add for this particular Assembly, click the "Quit" button. This will return to the tabbed "Graphical Based Diagnostic Utilities" window. If there are no further Assemblies, Tests, etc. to be processed, click on the "Quit" button to return to the DA Toolbar.

If a completely new set of tests is being developed or if a "Read Code" test set has been entered, this file should be saved with a "meaningful" name. This is done by clicking on the second button from the left on the DA Toolbar and entering a filename to save the new tests into. If this is a "Read Code" test set, then the filename should be in the format of RC15-14.SSA where the "15-14" portion of the filename is the paragraph number of the entry point for the given Failure Message.

Another feature which is often very useful in diagnostic development, is the ability to capture transient faults. Transient faults represent one of two problems which can be especially challenging to solve. One of the advantages of providing a "Visual Development" capability for 1553 messages, is the ability to set up a visual method for trapping transient failures. This also allows the "vectored" saving of diagnostic data.

Figure 24:
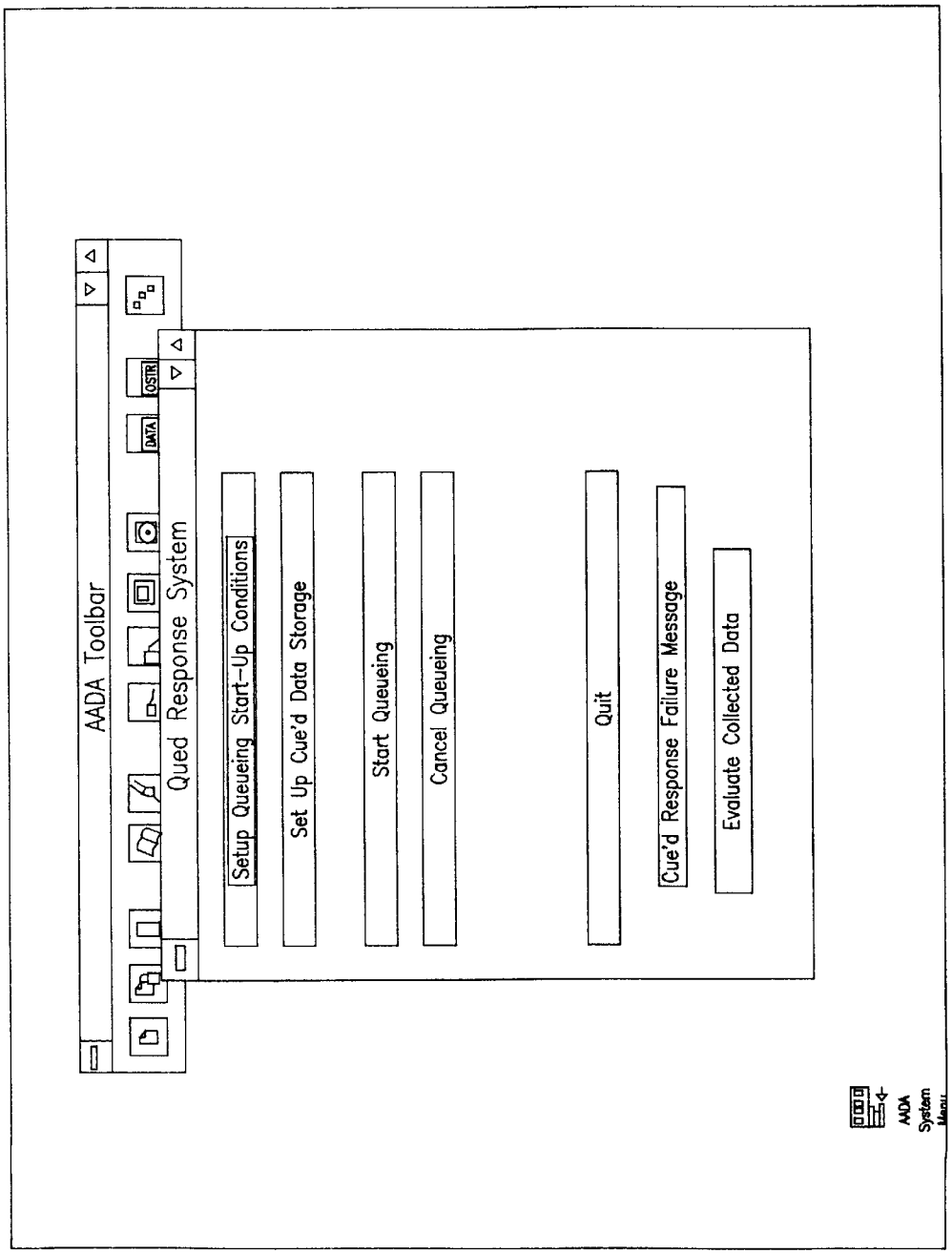
Figure 25:
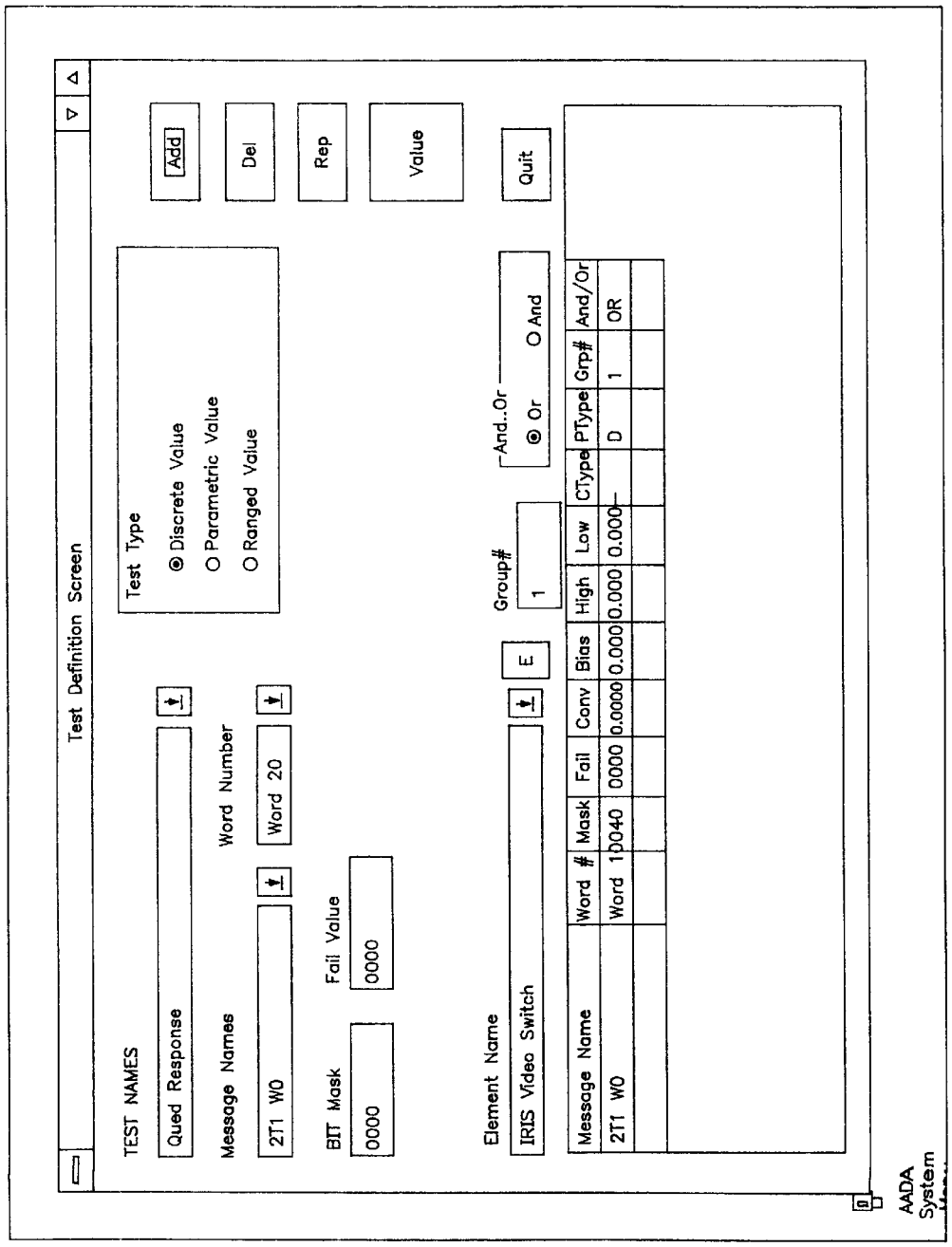

The "Que'd Response System" window is the main control window for Queued Response processing to capture transient faults, and is generally shown in FIG. 24. Pressing the "Setup Queueing Start Up Conditions" radio button will result in the screen of FIG. 24 being displayed. A "Setup Queueing Start Up Condition" is specified from a "pick and click" screen (the Test Definition screen). This screen, shown generally for example in FIG. 25, is completed in the same manner as the "Test Definition Screen" described above. This "Start Up Condition" can be thought of as the "trigger" for the Queued Response processing. When this "trigger" condition has been met (or has occurred), then the data collection will be started.

If a given "trigger" setup is to be used repeatedly (such as the IRIS Video Switch), it can be saved as a "Test Element" by filling in the "Element Name" box and then pressing the "E" (or "Element") button. When this screen's entries have been completed, press the "Add" button to add the test to the Cued Response system. Then click the "Quit" button to return to the "Queued Response System" window. Next, click the "Set Up Cue'd Data Storage" button to define the data that should be collected once the "trigger" condition has been satisfied.

Figure 26:
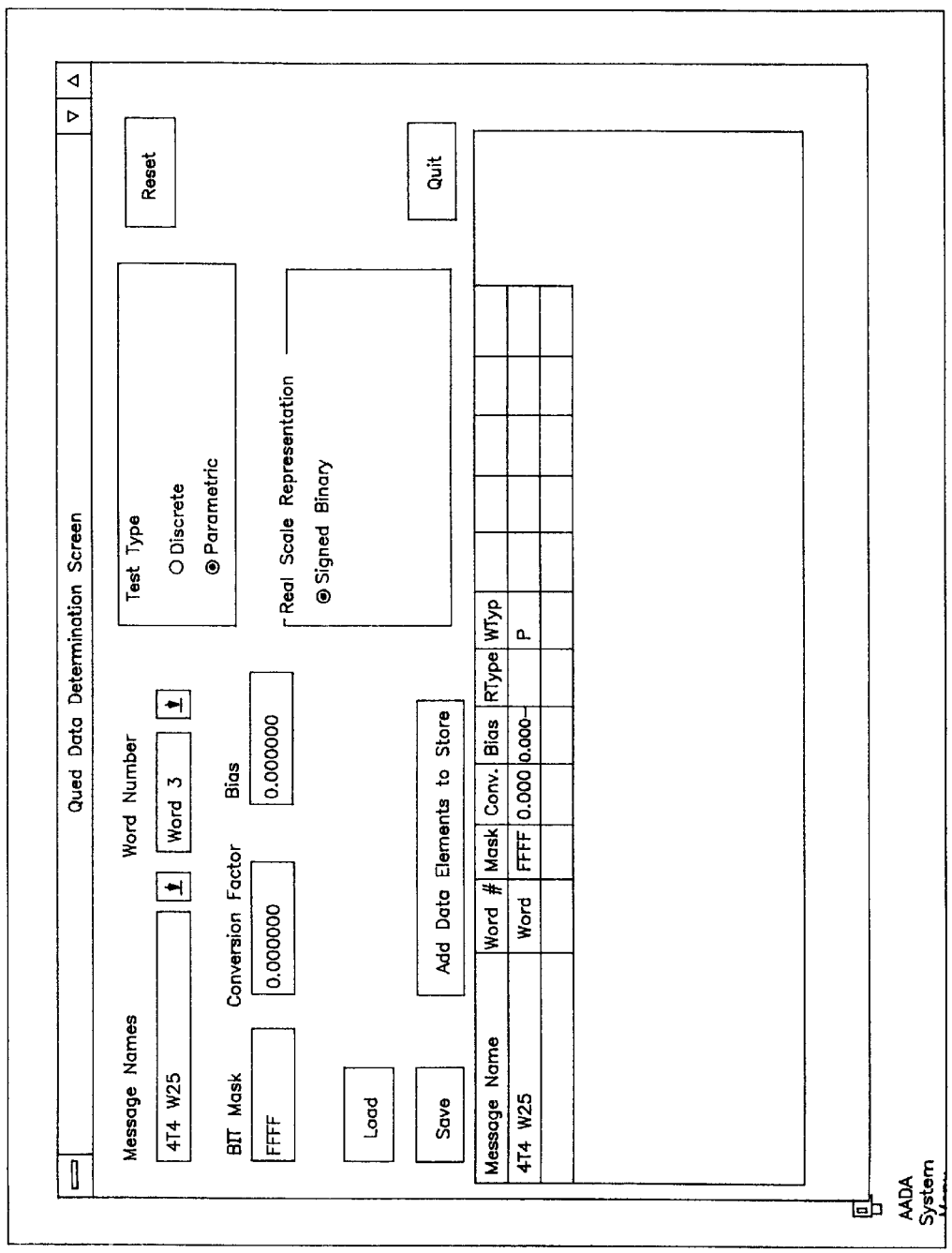

A separate "pick and click" screen, e.g., the "Qued Data Determination Screen" shown generally for example in FIG. 26, lets the operator define what data the operator wishes to collect. This screen is completed in a similar manner to the "Test Definition Screen" and when all of the entries have been completed, the "Add Data Element to Store" button is clicked to "add" the information to the Queued Data system.

Then click the "Quit" button to return to the "Queued Response System" window. Click the "Start Queueing" button to start the actual Queued Response processing. Once the "trigger" condition has been met, the colored bar will change to RED to indicate that the data collection has been started.

The system then collects this data unit 25% of all remaining machine RAM is used for data storage or until the "Cancel Queueing" button has been clicked. To stop the data collection, click the "Cancel Queueing" button.

Figure 27:
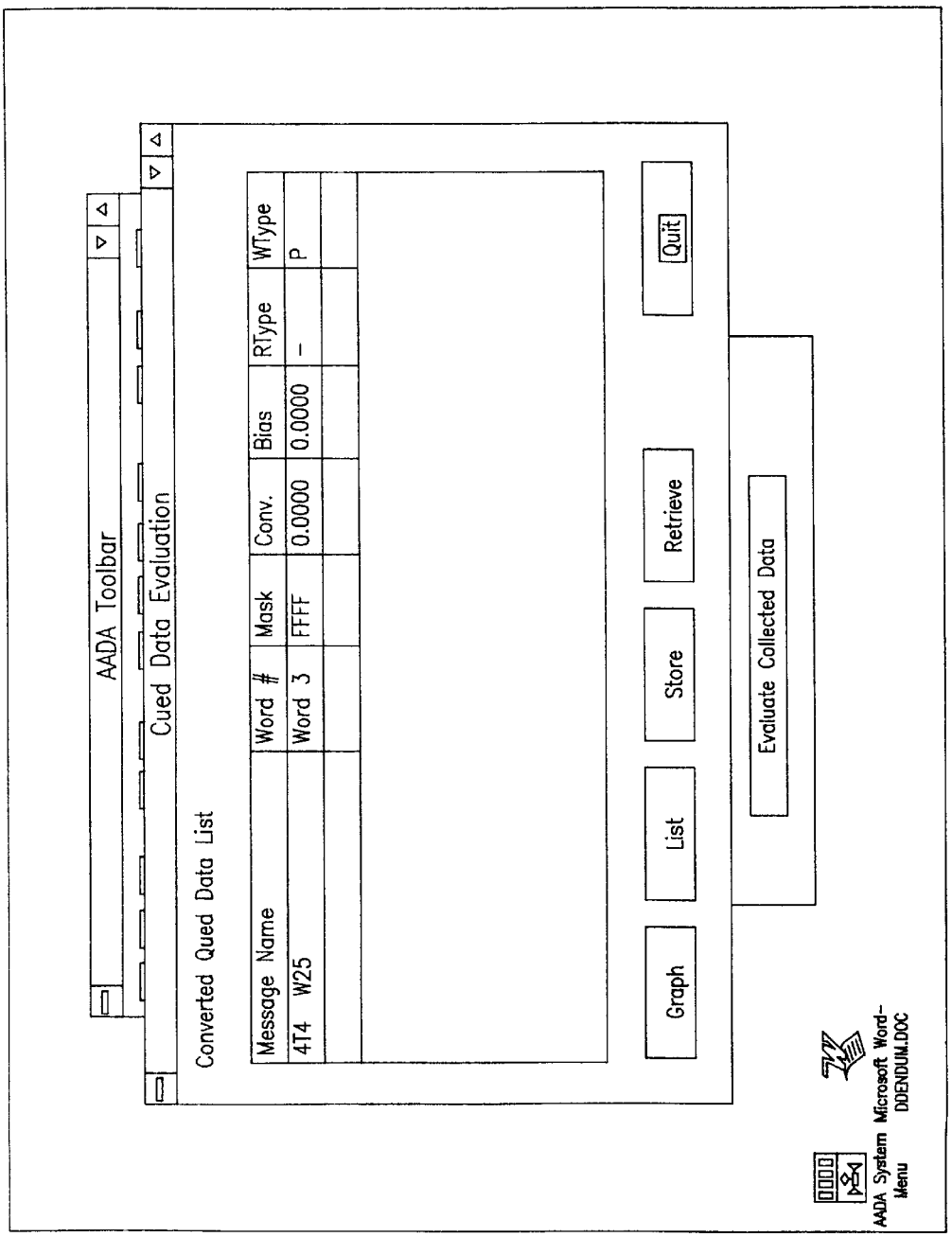

Now click on the "Evaluate Collected Data" button to bring up the screen generally shown in FIG. 27, and examine the collected data. This data can then be selected for graphing, straight data list, cut and pasted into a spreadsheet, etc.

Figure 28:
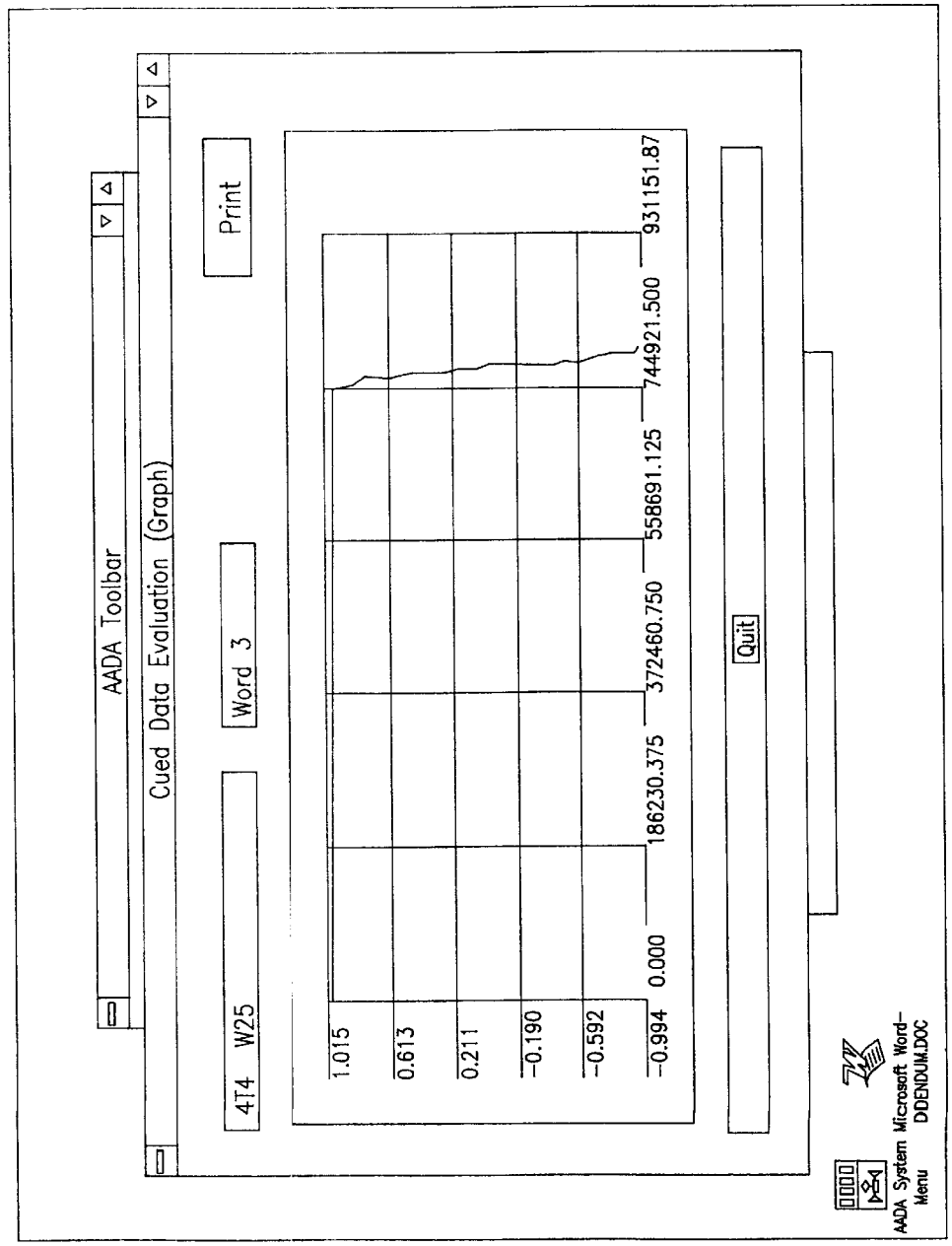

The stored data files have a "*.CDS" filename format. For this document, I am using a data file collected during a Queued Response data collection test which was performed while the TADS Turret was "stowed". Click on a displayed "Message Name" to select that message's data for evaluation. Then click on the desired action button depending on what the operator wishes to do with the collected data. If the "Graph" button is clicked, the screen shown generally in FIG. 28 will be displayed. FIG. 28 shows an exemplary graph of previously collected and stored data. When evaluation of the collected data is complete, the collected data can be saved by clicking on the "Store" button. A previously stored data collection file can be retrieved by clicking on the "Retrieve" button. Then the "Graph" or the "List" buttons can be clicked on to get a "second look" at the collected data. To return to the "Qued Response System" screen, click on the "Quit" button.

A diagnostic file for the Apache AH64 model "A" helicopter can be built using tests outlined in the "ARMY AH-64A HELICOPTER MULTIPLEX READ CODES" technical manual TM 1-1520-238-T-3 (hereafter Read Code manual), which is hereby incorporated by reference. The diagram shown in FIG. 29 assumes that 062475 is displayed on the HOD of the helicopter. The row labeled as "Bit" is the bit numbering system in the "ARMY AH-64A HELICOPTER MULTIPLEX READ CODES" manual (TM 1-1520-238-T-3). The row labeled as "Mux Database/DA Tool Bit" is the bit numbering system used in a "MUX DATA BASE DESCRIPTION" definition which can be part of the internal software for the DA tool. The row labeled as "Status" is the binary representation of the numbers from the top row which contains the displayed digits. In order to correlate the paragraphs in the Read Code manual with the information in the MUX Data Base Description printout, the following relationships need to be observed. 1) The "MEMORY LOCATION" from the Read Code manual corresponds to the "FCCMEM" column in the MUX Data Base Description printout. 2) The "MEMORY DATA BIT(S)" from the Read Code manual corresponds to the "Bit" row in the table above. Locate the appropriate bit number, then read down to the MUX Database/DA Tool Bit row (which is the last row in the table) to identify the correct bit number in the MUX Data Base Description printout. To give an example, the following paragraph has been copied from the Read Code manual:

15-14 SIGNAL NAME: BIT INITIATE TO TEU
MEMORY LOCATION: 001246
MEMORY DATA BIT(S): 4 (BINARY)
CONDITION: (None)
SIGNAL FUNCTIONS: Initiates or aborts built-in-test (BIT)
REMARKS: From FCC through LH FAB MRTU Type 1 to TEU
PASS: If sixth digit on HOD is 0, go to paragraph 15-15.
FAIL: Location of Fault: LH FAB MRTU Type 1, wiring from LH FAB MRTU
  Type 1 to TEU, TEU, FCC. Troubleshooting wiring to isolate fault (TM 9-1270-476-20-2).

Going to the MUX Data Base Description, the "FCC-MEM" (fire control computer memory) column would be searched until 001246 was found. Then going to the table, bit 4 corresponds to MUX bit 0. In the MUX Data Base Description printout, the bit numbers are displayed in the "MS" and "LS" columns. So for our example we would want the line with "BITE_INIT_CMD" in the "SIGNAL NAME" column. Looking in the far right column of the printout, it can be seen that 0=FALSE while 1=TRUE. From the example paragraph, if the 6$^{th}$ digit is a 0 then a "PASS" condition would exist. That would mean that there would be a 0 in bit 0 at memory location 001246. A "FAIL" condition would exist if there was a 1 in that bit at that memory location.

Due to the way that the DA Tool operates and to insure that both conditions are checked for and tested, a test for the "PASS" condition will need to be entered for this paragraph as well as a test for the "FAIL" condition will need to be entered for this paragraph. This means that there can be at least two tests entered for each Read Code paragraph in the Read Code manual. When entering Read Code tests, the "Assembly Name" entry should be used to provide a meaningful operator message to indicate what either PASSED or FAILED for the given test.

When entering tests, if the desired message (i.e., 2T1) is not displayed in one of the "Message Name" boxes, it can be added to the list of the "available" messages by going to the "Message Definition" tab in the "Graphical Based Diagnostic Utilities" window which is accessed by clicking on the Fourth button from the left on the DA Toolbar.

When entering a "string" of Read code tests, on the "lower" tests (paragraphs) the "Fail" test has to include all of the previous "Pass" tests in the "string".

In an embodiment of the invention, assemblies, tests, and relationships between assemblies and tests can be listed in an "SSA" file format. This SSA file format is shown, for example, in FIGS. 30A–30D, which is a partial copy of a printout of the DIAGDATA.TXT field that is created when the "Print Diagnostic Data" option is selected. The "Print Diagnostic Data" option is on the "Data Management" pulldown menu. The "Data Management" item is one of the menu items on the DA System Menu. Whenever the "Print Diagnostic Data" option is selected (by clicking on it), it will dump the contents of the currently loaded SSA file into a text file named DIAGDATA.TXT which if it is already present in the C:\DA\ directory will be overwritten.

Generally, the RC15_14.SSA line will not be placed in the file by the program. That was edited into the file after it was created to help identify which SSA file was loaded/ printed. Depending on the lengths of some of the entries, the lines may extend beyond the right hand margin of the printer if a compressed font is not used when printing. Almost all of the entries below are made (or can be made) via the DA Utilities module which is accessed by pressing the fourth button on the DA Toolbar. That will bring up the "Graphical Based Diagnostic Utilities" window. In FIGS. 30A–D, explanatory notes are enclosed in brackets and italicized to differentiate them from the file's normal entries.

In particular, FIG. 30D shows a Test Element, and also a Test Block. Test Elements are generic tests that can be used to create or define specific tests, and are simply listed in the SSA file. Test Blocks are individual tests associated with a Query. Multiple Test Blocks can be associated with each Query. Each Test Block is uniquely identified by the bracketed number following "Test Block", as shown in FIG. 30D. In Test Block [52] shown in FIG. 30D, Msg Index indicates which message the test will use, and Word Number indicates specifically which word within the message will be tested. The Query Index field indicates that Test Block [52] is associated with Query [1]. The Group Number is used to group tests or Test Blocks that are associated with a given Query. For example, where five Test Blocks are associated with a given Query, if three of the Test Blocks have Group Number=1 and two of the Test Blocks have Group Number= 2, then the five Test Blocks associated with the Query are divided into two groups. The And(1)/Or(0) field in Test Block [52] indicates how the results for Test Block [52] will be combined with the results of other Test Blocks within the group indicated by the Group Number field, either logically AND'ed or logically OR'ed.

In accordance with an embodiment of the invention, the probabilities that specific assemblies are malfunctioning is determined as follows. First, data is obtained from the 1553 bus (or other equivalent source, for example another bus or a stored data file). Second, the tests are applied to the data. Third, the probabilities for each assembly are computed by correlating the test results with the assemblies associated with each test. Fourth, assemblies that have computed probabilities greater than a threshold value (for example, the value of 0.8 described above) are displayed in order of probability.

In particular, the probabilities can be computed by first setting a probability Pi for each assembly, which is the computed probability that the assembly is faulty and needs to be replaced, to a value of 0.5. Next, an initial test is randomly selected, and all assemblies related to that test are determined by looking at the relationships that link the test to particular assemblies. As described above, each relationship between a test and an assembly can include a positive likelihood value and a corresponding negative likelihood value that indicate probabilistically whether the assembly is responsible for a specified outcome of the test. For the first assembly associated with the initial test, the $P_i$ for that assembly is recomputed using the equation:

$$P_{i+1} = (P_i * P_{pos}) / [(P_i * P_{pos}) + (1 - P_i) * P_{neg}]$$

where $P_{i+1}$ is the new value for $P_i$, $P_{pos}$ is the positive likelihood relating the test to the assembly, and $P_{neg}$ is the negative likelihood relating the test to the assembly, which is generally equal to $(1 - P_{pos})$.

The $P_i$ values for each of the assemblies related to the test are recomputed in the same way. Next, the $P_i$ values for all the assemblies are evaluated to determine which assembly has the currently highest $P_i$ value. All of the relationships linking the assembly with the highest $P_i$ value to different tests are evaluated, and the test corresponding to the relationship with the highest $P_{pos}$ value is selected, and then the process described above with respect to the initial test is repeated. This sequence can be repeated until a $P_i$ value rises above the threshold value. Then, $P_i$ values for remaining assemblies associated with the test which is currently being used to recompute the $P_i$ values, are computed and then computation is stopped and the assembly whose $P_i$ value first rose above the threshold (e.g., above 0.8) is displayed as a possibly needing replacement. If the $P_i$ value computations for the remaining assemblies associated with that last test cause any of those $P_i$ values to also rise above the threshold, then the corresponding assemblies are also displayed.

Alternatively, computation can continue until each test has been selected and the $P_i$ values of assemblies associated with that test have been recomputed.

As a further alternative, failure rates associated with each assembly can be used instead of the value of 0.5 for the initial $P_i$ value for each assembly.

The theory behind this process can also be explained with reference to the following example of a Bayesian Likelihood estimate calculation:

$$P_{i+1} = \frac{P_i \cdot P_{pos}}{[(P_i \cdot P_{pos}) + (1 - P_i) \cdot P_{neg}]}$$

where $P_i$ is the Likelihood Estimate of a particular hypothesis being true after I evocation of evidence with a positive likelihood estimate of 80% and a negative likelihood estimate of 20%.

The specific meaning of the likelihood estimates is determined by the user. In some cases it may represent a heuristic belief that a particular query indicates that a specific hypothesis is true. For example, personnel in charge of maintenance of a laser system may indicate that failure of a laser power test indicates a 90% likelihood that the laser transmitter is failed. Physical relationships may also be modified. For example, an 80% likelihood for a particular test (query) may mean that 80% of an item's (hypothesis) failure rate is checked through the software routines making up the test.

The Bayesian formula selected follows several rules which are absolutely required to formulate such a diagnostic system:

(1) A Query (test) with a likelihood of 1.0 for any hypothesis results in a likelihood of 1.0 for that hypothesis regardless of the previous evidence for that hypothesis. From a more diagnostic point of view, if a test is run which can only fail if a particular piece of equipment is defective, the diagnostic system must be able to indicate 100%.

Regardless of the present (prior) likelihood of a particular hypothesis (conclusion) up to the point where a 100% likelihood estimate is evoked, the resulting likelihood for that hypothesis (conclusion) is 1. Put another way, if you evoke a test which absolutely proves that a particular item is failed, the diagnostic system must be able to indicate absolute (1.0 likelihood) confidence in the selection of that failed item as the cause.

Another requirement is that if a query absolutely cannot be caused by a particular hypothesis, you must have some way of indicating that the likelihood of that conclusion is 0 from then on. The Bayesian formula accommodates this requirement. Again, regardless of the previous likelihood value of a particular hypothesis, its resultant likelihood after evoking is 0.0 positive likelihood estimate is 0.0. Thus, if a test failed which has nothing to do with a particular piece of hardware, that hardware should be removed from further consideration.

In addition, whenever a hypothesis' likelihood goes to 1.0 or 0.0, it remains unchanged regardless of any evidence which effects that hypothesis in the future.

In terms of diagnostic, it is decided that a particular piece of hardware is absolutely the cause of failure or not the cause of failure, system operation will only provide further alternatives but will not change the original conclusion.

Many of the "belief" type systems which incorporate production rule type inference engines do not have this property. In fact, for known software shells, interim absolute conclusions are not possible.

The remaining requirements are derived from the desired operation of the system. Likelihood estimates have some stable relationship to both queries (tests) and hypothesis (conclusions). For example, an 80% likelihood estimate based on a particular query's relationship to a specific hypothesis should represent less confidence than a conclusion based on a 90% likelihood estimate for the same query. In practical terms, if a failure of a particular test evokes an 80% likelihood that a certain piece of equipment is failed, and a 90% likelihood that a different piece of equipment is failed, the system should select the equipment with the 90% likelihood as the most probable. Notice that in these illustrations we are changing the current likelihood estimate while holding the prior likelihood at a constant value. This is because in the previous examples we were showing that given an absolute proof or dis-proof of a hypothesis (conclusion) the system would indicate absolute certainty regardless of any previous level of certainty (i.e., a likelihood estimate of 0.0 or 1.0 resulted in a hypothesis likelihood of 0.0 or 1.0 respectively regardless of the current likelihood value). The current example is showing how the system reacts to different likelihood estimate values.

For likelihood values of 0.5, which indicates that the query (test) being evoked does not affect the related hypothesis (conclusion) either positively or negatively, the resultant hypothesis likelihood should be the same as the current likelihood estimate. (i.e., if the passing or failing of a test does not either enforce or detract from a belief that a particular piece of equipment is the cause of failure, the system should leave the value representing the original belief to remain unchanged).

On the other hand, likelihood estimates above 0.5 should result in an increase in the value representing a belief that the associated equipment is the cause of failure, and likelihood estimates below 0.5 should decrease the value.

Also, because there can be no more than 100% belief that a piece of equipment is the cause of failure or less than 0% belief, the resultant likelihoods for any conclusion should converge toward 0.0 and 1.0 but never fall below or exceed these values respectively. The Bayesian formula provided demonstrates these properties. The non-linear nature of the formula should also be noted, and falls very much in line with how people react to evidence.

For example, when there is a strong belief that a particular piece of equipment is the cause of failure, failure of another test which indicates the same piece of equipment is not going to have near the same effect (quantitatively) as failing a test which indicates that the suspected piece of equipment is not the cause of failure. More specifically, starting with a 0.9 conviction that a particular piece of equipment is the cause of failure, evoking of a query (test) with a 0.9 likelihood that the piece of equipment is the cause of failure increases the conviction to 0.988. Alternately, if evoking a query (test) with a 0.1 likelihood (strong likelihood of the piece of equipment not being the failed hardware) the resulting conviction becomes 0.5. As the conviction approaches 100%, it becomes harder and harder for make strong changes in the conclusion. If they were 95% convinced that a particular item was the cause of failure instead of the original 90%, the resultant value would only increase 0.08. So a 5.5% increase in the conviction prior to the failing of this test only results in a 0.6 increase in the resultant conviction. This is only for conclusions which include some level of ambiguity. If no ambiguity exists, the likelihood estimate can be set to 1.0 which would result in absolute certainty that the associated hardware was the cause of failure. But as long as some level of ambiguity exists, the system should converge on, but not achieve, certainty.

On the other hand, absent any preconceived notions about a conclusion's validity or lack of validity, the first likelihood estimate should result in its own value (i.e., if a 50/50 chance of being or not being the cause of failure exists, and then a test is failed which indicates an 80% likelihood that it is the cause of failure, the resultant could, for example, desirably be 80%. Practically, given the first test that indicates that a particular conclusion is 80% likely and no previous information either support or detract from the conclusion, the system must conclude that the conclusion is 80% likely. The Bayesian formula has this property.

In accordance with an embodiment of the DA tool, for example an embodiment that uses the SSA file format shown in FIGS. 30A–30E, when the DA tool learns, the positive and negative likelihood values can be altered using the adaption rate so that the DA tool will "remember" what it has learned. For example, the positive likelihood can be incremented by the adaption rate and the negative likelihood can be correspondingly decremented by the adaption rate to strengthen a relationship, or vice versa to weaken a relationship. The Active Bias field shown on FIG. 30E can represent an acceptance level.

For example, embodiments of the invention can use the following adaption process:

(1) The saved diagnostic data is re-evaluated to create a list of all evoked, i.e., executed, tests;

(2) One or more Assemblies are selected as failed using the current Positive Likelihoods (Ppos);

(3) The operator selects the Correct Failed Assembly from a list of all Assemblies;

(4) All tests are evoked and Positive Likelihoods modified in the following manner:

(4A) If A Relationship to the Correct Failed Assembly exists its Positive Likelihood is increased by a value of 1 minus the present Positive Likelihood times the adaption rate. For example if the current positive likelihood were 0.9 for that test and the Adaption Rate were 0.5, the new Positive Likelihood would be [(1−0.9)*0.5+0.9], or 0.95. If this value is greater than the maximum Positive Likelihood established (which should be 0.92 or less to prevent errors that would result from rounding) then it is set to the maximum Positive Likelihood.

(4B) If a Relationship to an assembly other than the correct assembly exists, its Positive Likelihood is reduced by a value of the (current positive likelihood−0.5) times the adaption rate. If the positive likelihood is set below 0.5 it is set to 0.5. This modification ensures against a divide by zero failure if adaption rates>1 are used by mistake.

(4C) If no relationship currently exists for the correct failed assembly, a relationship is established with a positive likelihood of 0.6.

After all the tests have been evoked, the positive likelihoods for the correctly selected failed assembly have been increased, and the positive likelihoods for the incorrectly selected assemblies have been reduced by a proportion dependent on the number of tests involved and the positive likelihoods established for each of the evoked tests.

In accordance with an embodiment of the invention, data from different sources such as different data buses can be simultaneously collected, and can be either jointly or separately evaluated.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A diagnostic tool for troubleshooting a system based on status information, comprising:

a diagnostic file containing lists of assemblies within the system, lists of test definitions for evaluating the status information, and numeric relationships between the listed assemblies and the listed test definitions;

a software program for evaluating the status information using the diagnostic file and providing a diagnostic report of the evaluation; and a computer for running the software program and accessing the diagnostic file;

wherein the diagnostic file is structured so that the test definitions are each independent and the numeric relationships are each reversibly traceable.

2. The tool of claim 1, wherein the status information is obtained from a 1553 data bus.

3. The tool of claim 2, further comprising data cables for conveying the status information from the 1553 data bus to the computer.

4. The tool of claim 1, where the software automatically corrects the relationships in response to corrective feedback provided by an operator.

5. The tool of claim 4, wherein a case based adaption rate value determines a magnitude of each automatic correction.

6. The tool of claim 1, wherein the diagnostic report includes a listing of tests that failed during evaluation of the status information, and a listing of assemblies associated with the failed tests.

7. The tool of claim 6, wherein the diagnostic report further includes estimated probabilities as to how likely the listed assemblies are to have caused the test failures.

8. The tool of claim 7, further comprising an acceptance level that is used as a threshold when determining which assemblies to list in the diagnostic report.

9. The tool of claim 1, wherein each relationship between a test definition and an assembly includes at least one of a positive likelihood and a negative likelihood.

10. The tool of claim 9, wherein the relationship includes a failure rate associated with the assembly.

11. A method for evaluating assemblies within a system that are connected via a bus, comprising the steps of:
listening on the bus for status information regarding the assemblies;
evaluating the status of the assemblies by performing the substeps of:
testing the status information by comparing predetermined components of the status information with test values;
correlating the test results with assemblies based on numeric values that indicate a strength of a causative relationship between each test result and an assembly;
assigning a probability for each of the assemblies based on the correlation;
selecting ones of the assemblies for inclusion in a diagnostic report;
presenting the diagnostic report, including the assigned probability for each selected assembly.

12. The method of claim 11, wherein at least one of the assigned probabilities is assigned to a group of assemblies based on the correlation.

13. The method of claim 11, wherein the probability indicates a likelihood that the corresponding assembly is malfunctioning.

14. The method of claim 11, wherein the probability indicates a likelihood that the corresponding assembly caused specific test results.

15. The method of claim 11, wherein at least one of the predetermined components is compared with a predetermined test value to determine whether the predetermined component is equal to the predetermined test value.

16. The method of claim 11, wherein at least one of the predetermined components is compared with a predetermined range of values to determine whether the predetermined component is within the predetermined range of values.

17. The method of claim 11, further comprising the steps of:
receiving corrective feedback from an operator with respect to a probability associated with a selected assembly and listed in the diagnostic report; and
altering the numeric values for the selected assembly based on the corrective feedback.

18. The method of claim 17, wherein a magnitude of the alteration of the numeric values is determined by a case based adaption rate value.

19. The method of claim 11, wherein assemblies are selected based on a comparison of the probability assigned to each assembly with an acceptance level value.

20. The method of claim 19, wherein assemblies having an assigned probability that is greater than the acceptance level value are selected.

21. The method of claim 11, wherein the numeric values for each assembly include at least one of a positive likelihood and a negative likelihood.

22. The method of claim 11, wherein the probability for each assembly is based on a failure rate for the assembly.

23. The method of claim 11, further comprising the step of assigning an initial probability for each of the assemblies equal to a value of 0.5.

24. The method of claim 11, wherein the substeps of correlating and assigning comprise the steps of:
calculating the probability for each of the assemblies with respect to one of the test results using a first equation $P_{i+1}=(P_i*P_{pos})/[(P_i*P_{pos})+(1-P_i)*P_{neg}]$; and
assigning the probability $P_{i+1}$ to the assembly; wherein
$P_i$ is the probability previously assigned to the assembly,
$P_{pos}$ is a positive likelihood indicating the strength of the causative relationship between the test result and the assembly, and
$P_{neg}$ is a negative likelihood indicating the strength of the causative relationship between the test result and the assembly.

25. The method of claim 24, wherein $P_{neg}=(1-P_{pos})$.

26. The method of claim 24, wherein the substeps of correlating and assigning further comprise the steps of:
determining which assembly has the highest assigned probability with respect to the one test result;
calculating for the determined assembly a probability for each test result using the first equation;
selecting the test result corresponding to the highest calculated probability for the determined assembly;
performing the step of calculating the probability for each of the assemblies with respect to one of the test results, using the selected test result as the one test result; and
repeating the steps of
calculating the probability for each of the assemblies,
assigning the probability $P_{i+1}$ to the assembly,
determining which assembly has the highest assigned probability,
calculating for the determined assembly a probability for each test result,
selecting the test result corresponding to the highest calculated probability, and
performing the step of calculating the probability for each of the assemblies using the selected test result,
until at least one of the probabilities rises above a threshold.

27. Method of claim 26, wherein the substep of selecting ones of the assemblies for inclusion in the diagnostic report includes the step of selecting each assembly corresponding to each at least one probability above the threshold.

* * * * *

UNITED STATES PATENT AND TRADEMARK OFFICE
CERTIFICATE OF CORRECTION

PATENT NO.   : 6,219,626 B1
DATED        : April 17, 2001
INVENTOR(S)  : Michael J. Steinmetz and Michael E. Kirst It is certified that error appears in the above-identified patent and that said Letters Patent is hereby corrected as shown below:

<u>Title page,</u>
Please add the following:
[73] Assignee: Lockheed Martin Corporation, Bethesda, Maryland Signed and Sealed this Eighth Day of January, 2002

*Attest:*

*Attesting Officer*

JAMES E. ROGAN
*Director of the United States Patent and Trademark Office*